United States Patent
Omori et al.

(10) Patent No.: US 8,097,332 B2
(45) Date of Patent: Jan. 17, 2012

(54) INDEXABLE CUTTING INSERT

(75) Inventors: Naoya Omori, Itami (JP); Yoshio Okada, Itami (JP); Minoru Itoh, Itami (JP); Susumu Okuno, Itami (JP); Shinya Imamura, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 821 days.

(21) Appl. No.: 11/913,292

(22) PCT Filed: Dec. 26, 2006

(86) PCT No.: PCT/JP2006/325899
§ 371 (c)(1),
(2), (4) Date: Oct. 31, 2007

(87) PCT Pub. No.: WO2007/077822
PCT Pub. Date: Jul. 12, 2007

(65) Prior Publication Data
US 2009/0067938 A1  Mar. 12, 2009

(30) Foreign Application Priority Data

Jan. 6, 2006 (JP) ................... 2006-001738

(51) Int. Cl.
*B23B 27/14* (2006.01)
(52) U.S. Cl. ............ 428/216; 51/307; 51/309; 407/119; 428/336; 428/698; 428/701; 428/702; 428/704
(58) Field of Classification Search ............ 51/307, 51/309; 428/216, 336, 698, 701, 702, 704; 407/119
See application file for complete search history.

(56) References Cited

U.S. PATENT DOCUMENTS

| | | | |
|---|---|---|---|
| 4,895,770 A | 1/1990 | Schintlmeister et al. | |
| 6,187,421 B1 * | 2/2001 | Moriguchi et al. | 428/701 |
| 7,087,295 B2 * | 8/2006 | Okada et al. | 428/216 |
| 7,090,914 B2 * | 8/2006 | Yamagata et al. | 428/336 |
| 2003/0104254 A1 | 6/2003 | Westphal et al. | |
| 2005/0042482 A1 | 2/2005 | Okada et al. | |
| 2006/0246320 A1 | 11/2006 | Kathrein et al. | |

FOREIGN PATENT DOCUMENTS

AT        008346 U1    6/2006

(Continued)

OTHER PUBLICATIONS

German Office Action for corresponding DE Application No. 11 2006 001 156.1-14, Apr. 16, 2009, Germany.

(Continued)

*Primary Examiner* — Archene Turner
(74) *Attorney, Agent, or Firm* — Ditthavong Mori & Steiner, P.C.

(57) ABSTRACT

An indexable cutting insert (1) includes a base (8) and a coating layer, wherein the coating layer includes an inner sublayer and an outer sublayer, each of subsublayer constituting the inner sublayer is composed of a compound containing at least one element selected from the group consisting of Group IVa elements, Group Va elements, Group VIa elements in the periodic table, Al, and Si, the outer sublayer is an alumina sublayer or a sublayer containing aluminum, and in portions of the outer sublayer participating in cutting, when an average thickness on the flank face (3) side is represented by A μm and an average thickness on the rake face (2) side is represented by B μm, $A/B \leq 0.95$.

18 Claims, 5 Drawing Sheets

FOREIGN PATENT DOCUMENTS

| | | |
|---|---|---|
| DE | 3434616 A1 | 8/1985 |
| EP | 0306077 A2 | 8/1988 |
| EP | 0 683 244 A2 | 11/1995 |
| EP | 0 965 404 A1 | 12/1999 |
| EP | 1473101 A1 | 1/2003 |
| EP | 1 306 150 A1 | 5/2003 |
| EP | 1 310 580 A2 | 5/2003 |
| FR | 2370551 * | 7/1978 |
| JP | 56-42412 B2 | 10/1981 |
| JP | 60-249505 | 12/1985 |
| JP | 6-79502 A | 3/1994 |
| JP | 11-124672 | 5/1999 |
| JP | 11-131235 | 5/1999 |
| JP | 11-140647 | 5/1999 |
| JP | 11-267905 | 10/1999 |
| JP | 2001-347403 | 12/2001 |
| JP | 2004-122263 | 4/2004 |
| JP | 2004-122264 | 4/2004 |
| JP | 2004-216488 | 8/2004 |
| JP | 2005-103658 * | 4/2005 |
| WO | WO 03/061885 | 7/2003 |
| WO | PCT/JP2006/325899 | 4/2007 |

OTHER PUBLICATIONS

Notice of Opposition against German Patent for corresponding DE Application No. 11 2006 001 156.1-14, dated Feb. 4, 2011, pp. 1-35 Germany.

Japanese Office Action for corresponding JP Application No. 2006-001738, dated Apr. 19, 2011, pp. 1-4, Japan.

* cited by examiner

INDEXABLE CUTTING INSERT

TECHNICAL FIELD

The present invention relates to indexable cutting inserts (also referred to as "throw-away inserts").

BACKGROUND ART

Indexable cutting inserts that detachably mounted on tools for cutting workpieces have been known. To improve wear resistance and toughness, many types of indexable cutting inserts each having a structure of a base composed of, for example, a cemented carbide or a cermet, coated with a hard coating composed of, for example, a ceramic material, have been reported.

In such indexable cutting inserts, attempts have been made to improve characteristics by a change in the composition of the hard coating and by the difference of the thickness of the hard coating between on a flank face and on a rake face (Japanese Unexamined Patent Application Publication Nos. 2001-347403 (Patent Document 1), 2004-122263 (Patent Document 2), 2004-122264 (Patent Document 3), and 2004-216488 (Patent Document 4)). High-speed cutting, precision cutting, high-efficiency cutting for difficult-to-cut materials, and the like have been required. However, no indexable cutting insert which has an excellent balance between wear resistance and toughness required for such various types of cutting and which has a surface layer that is substantially prevented from being detached is developed.

Patent Document 1: Japanese Unexamined Patent Application Publication No. 2001-347403
Patent Document 2: Japanese Unexamined Patent Application Publication No. 2004-122263
Patent Document 1: Japanese Unexamined Patent Application Publication No. 2004-122264
Patent Document 1: Japanese Unexamined Patent Application Publication No. 2004-216488

DISCLOSURE OF INVENTION

Problems to be Solved by the Invention

The present invention has been made in light of the circumstances described above. It is an object of the present invention to provide an indexable cutting insert which has an excellent balance between wear resistance and toughness and which has a surface layer that is substantially prevented from being detached. In particular, it is another object of the present invention to provide an indexable cutting insert having a balance between toughness and wear resistance on a rake face side and being effective for high-speed cutting of ductile cast iron.

Means for Solving the Problems

To overcome the above-described problems, the Inventors have conducted intensive studies of a contact state between an indexable cutting insert and a workpiece during cutting, and have found that in a cutting situation in which as shown in FIG. 1, the periphery of an edge line 4 of an indexable cutting insert 1 is in contact with a workpiece 5, a flank face 3 facing the workpiece 5, and a rake face 2 being located on a chip 6 side, the following conflicting characteristics have been required: a reduction in the thickness of the coating layer improves toughness; but an increase in the thickness of the coating layer improves wear resistance. Furthermore, it has been found that the use of a layer containing alumina as the surface sublayer of the coating layer advantageously prevents the deposition of the workpiece, whereas, disadvantageously, the surface sublayer is easily detached because of an underlying sublayer present directly below the surface sublayer. The inventors have further conducted studies and have found that the improvement of wear resistance of the rake face is advantageous to high-speed cutting of ductile cast iron, and the formation of a sublayer having a specific composition as the alumina-containing surface sublayer significantly improves resistance to detachment. The resulting findings have resulted in the completion of the present invention.

An indexable cutting insert of the present invention includes a base and a coating layer, wherein the base includes at least one flank face and at least one rake face, the flank face is connected to the rake face with an edge line provided therebetween, the coating layer includes an inner sublayer having one or more subsublayers and an outer sublayer formed on the inner sublayer, each of the subsublayers constituting the inner sublayer is composed of a compound containing at least one element selected from the group consisting of Group IVa elements, Group Va elements, Group VIa elements in the periodic table, Al, and Si, and at least one element selected from the group consisting of carbon, nitrogen, oxygen, and boron, the outer sublayer is an alumina sublayer or a sublayer containing aluminum, and in portions of the outer sublayer participating in cutting, when an average thickness on the flank face side is represented by A μm and an average thickness on the rake face side is represented by B μm, A/B≦0.95.

An indexable cutting insert of the present invention includes a base and a coating layer, wherein the base includes at least two flank faces, at least one rake face, and at least one corner, each of the flank faces is connected to the rake face with an edge line provided therebetween, the corner is a point of intersection of the two flank faces and the rake face, the coating layer includes an inner sublayer having one or more subsublayers and an outer sublayer formed on the inner sublayer, each of the subsublayers constituting the inner sublayer is composed of a compound containing at least one element selected from the group consisting of Group IVa elements, Group Va elements, Group VIa elements in the periodic table, Al, and Si, and at least one element selected from the group consisting of carbon, nitrogen, oxygen, and boron, the outer sublayer is an alumina sublayer or a sublayer containing aluminum, and on a line passing through the corner participating in cutting and bisecting an angle defined by the two flank faces constituting the corner, the line lying on the rake face and extending to an edge where the two flank faces intersect each other, when the average thickness of the outer sublayer in a segment region from 0.5 mm to 1 mm apart from the corner toward one of the flank faces is defined as A μm, and when the average thickness of the outer sublayer in a segment region from 0.5 mm to 1 mm apart from the corner toward the rake face is defined as B μm, A/B≦0.95.

Preferably, at least part of the coating layer has a compressive stress. More preferably, at least part of the outer sublayer has a compressive stress. Preferably, the uppermost subsublayer constituting the inner sublayer is in contact with the outer sublayer and is composed of a compound containing Ti and at least one element selected from carbon, nitrogen, oxygen, and boron.

Preferably, the compound containing Ti and at least one element selected from carbon, nitrogen, oxygen, and boron is titanium boronitride $TiB_XN_Y$ (wherein X and Y are each expressed in terms of atomic percent, and $0.001<X/(X+Y)<0.04$). Alternatively, preferably, the compound containing Ti and at least one element selected from carbon, nitrogen, oxygen, and boron is titanium oxyboronitride $TiB_XN_YO_Z$ (wherein X, Y, and Z are each expressed in terms of atomic percent, $0.0005 < X/(X+Y+Z) < 0.04$ and $0 < Z/(X+Y+Z) < 0.5$).

Preferably, the outer sublayer is not formed on part or the entirety of an edge line portion participating in cutting. Preferably, the coating layer has a thickness of 0.05 μm to 30 μm.

The base may be composed of a material selected from cemented carbides, cermets, high-speed steels, ceramic materials, sintered cubic boron nitride compacts, sintered diamond compacts, and sintered silicon nitride compacts.

The indexable cutting insert may be an indexable cutting insert used for drilling, end milling, milling, turning, metal-slitting saw machining, gear-cutting tool machining, reamer machining, tap machining, and crankshaft pin milling.

Advantages

The indexable cutting insert of the present invention has the above-described structure, an excellent balance between wear resistance and toughness, and a surface layer that is substantially prevented from being detached. In particular, the indexable cutting insert has a balance between the toughness of a cutting edge and wear resistance on a rake face side and is thus effective for high-speed cutting of ductile cast iron. When a workpiece is ductile cast iron, the present invention exerts a particularly excellent effect. However, the present invention can also exert a satisfactory effect on workpieces as well as ductile cast iron.

Figure 1:
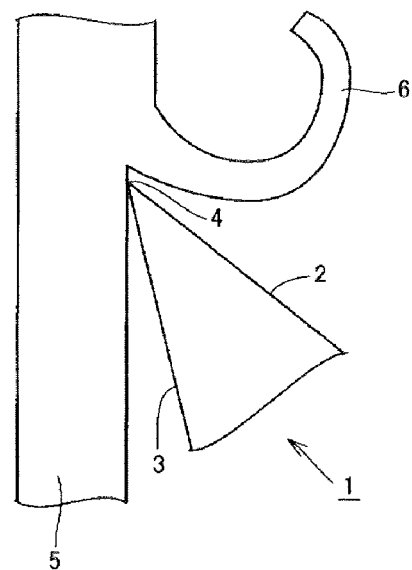
FIG. 1 is a schematic diagram illustrating a state in which an indexable cutting insert is in contact with a workpiece during cutting.

REFERENCE NUMERALS 1 indexable cutting insert; 2 rake face; 3 flank face; 4 edge line; 5 workpiece; 6 chip; 7 through hole; 8 base; 9 corner; 11 coating layer; 12 inner sublayer; 13 outer sublayer

BEST MODE FOR CARRYING OUT THE INVENTION

The present invention will be described in more detail below. Embodiments will be described with reference to the drawings. In the drawings of the present invention, the same or equivalent elements are designated using the same reference numerals. Each drawing is merely an exemplary schematic diagram. The ratio of the thickness of a coating layer to the size of a base and the ratio of a corner radius (R) are different from actual ratios.

<Indexable Cutting Insert>

An indexable cutting insert of the present invention includes a base and a coating layer formed on the base. The indexable cutting insert of the present invention is particularly useful for drilling, end milling, milling, turning, metal slitting saw machining, gear-cutting tool machining, reamer machining, tap machining, and crankshafts pin milling.

The present invention is available for both negative and positive indexable cutting inserts. Furthermore, the present invention is available for both negative and positive indexable cutting inserts with or without a chip breaker.

<Base>

Any of known materials constituting bases used for such indexable cutting inserts may be used for the base of the present invention without particular limitation. Examples thereof include cemented carbides, such as WC-based cemented carbides, cemented carbides containing WC and Co, and cemented carbides containing WC, Co, and carbides, nitrides, and carbonitrides of Ti, Ta, and Nb; cermets, such as cermets each mainly composed of TiC, TiN, or TiCN; high-speed steels; ceramic materials, such as titanium carbide, silicon carbide, silicon nitride, aluminum nitride, aluminum oxide, and mixtures thereof; sintered cubic boron nitride compacts; sintered diamond compacts; and sintered silicon nitride compacts.

The base composed of any of these materials may be subjected to surface modification. For example, in the case of a cemented carbide, a β-free layer may be formed on the surface thereof. In the case of a cermet, a surface-hardening layer may be provided. Even when the surface is modified as described above, advantages of the present invention are exhibited.

Any of known shapes of bases used for such indexable cutting inserts may be used for the base of the present invention without particular limitation. In the case where the shape is expressed as a section parallel to the surface (top face) of the base, examples of the shape include a rhombus, a square, a triangle, a circle, and an ellipse.

Figure 2:
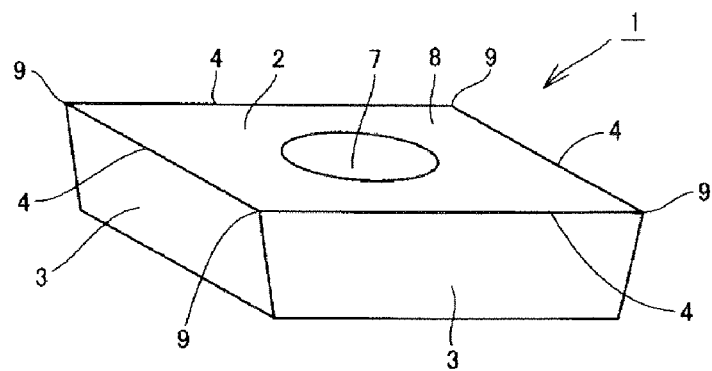
FIG. 2 is a schematic perspective view of an indexable cutting insert according to an embodiment of the present invention.

As shown in FIG. 2, for example, such a base 8 has a structure including at least one flank face 3 and at least one rake face 2. The flank face 3 is connected to the rake face 2 with the edge line 4 provided therebetween. The edge line 4 serves as a central point of the action of cutting a workpiece. More preferably, the base 8 has a structure including at least two flank faces 3, at least one rake face 2, and at least one corner 9. The corner 9 is a point of intersection of the two flank faces 3 and one rake face 2 and serves often as the most central point of the action of cutting.

In the present invention, the idea of the expressions "rake face", "flank face", "edge line", and "corner" includes portions and planes located on the uppermost surface of the indexable cutting insert 1 and corresponding portions located on surfaces and in insides of layers, such as an inner layer and an outer layer as well as the surfaces of the base.

The edge line 4 is linear but is not limited thereto. For example, the edge line 4 may be circumferential, corrugated, curved, or bent. The edge line, the corner, and other edges may be subjected to edge processing, such as chamfering and/or corner-radius forming. When the edge line does not have a clear edge or when the corner does not have a clear point of intersection due to edge processing, the rake face and the flank face that undergo edge processing are geometrically extended on the basis of a state before the edge processing to determine an edge or a point of intersection between both planes as a hypothetic edge or point of intersection so that the hypothetically determined edge is regarded as an edge line or the hypothetically determined point of intersection is regarded as a corner. The expression "the rake face and the flank face are connected to each other with the edge line provided therebetween" and the expression "having the edge line" include the case where the edge line is subjected to the above-descried edge processing. The expression "the point of intersection of two flank faces and one rake face" and the expression "the point of intersection is a corner" include the case where the corner is subjected to the edge processing.

Although the rake face 2 is shown as a flat surface in FIG. 2, the rake face may have another structure, for example, a structure having a chip breaker or the like, according to need. This applies to the flank face 3. Although the flank face 3 is shown as a flat surface in FIG. 2, the flank face 3 may be chamfered (divided into a plurality of surface regions), formed into a shape different from a flat surface or a curved surface using another method, or provided with a chip breaker, according to need.

A through hole 7 may be formed so as to pass through the base from the top to the bottom and used as a fixing hole for attaching the indexable cutting insert 1 to a tool. If required, in addition to or instead of the fixing hole, another fixing means may be provided.

<Coating Layer>

As shown in FIGS. 3 to 6, for example, a coating layer 11 is formed on the base 8. The coating layer 11 includes an inner sublayer 12 (in each figure, indicated as a single sublayer, for convenience) and an outer sublayer 13 formed on the inner sublayer 12. The inner sublayer 12 and the outer sublayer 13 will be separately described below.

Figure 3:
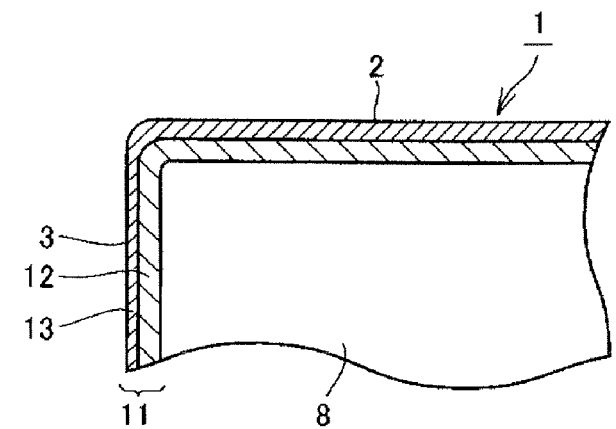
FIG. 3 is a schematic cross-sectional view of a negative indexable cutting insert without a chip breaker.
Figure 4:
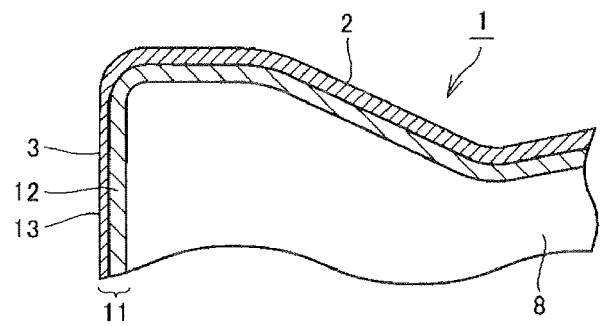
FIG. 4 is a schematic cross-sectional view of a negative indexable cutting insert with a chip breaker.
Figure 5:
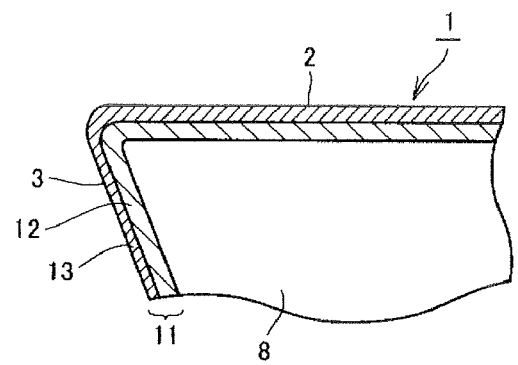
FIG. 5 is a schematic cross-sectional view of a positive indexable cutting insert without a chip breaker.
Figure 6:
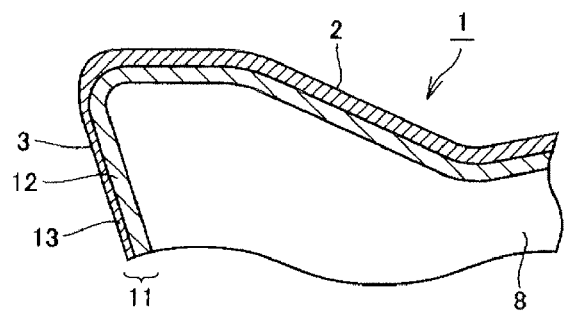
FIG. 6 is a schematic cross-sectional view of a positive indexable cutting insert with a chip breaker.

FIGS. 3 and 4 are each a schematic cross-sectional view of the negative indexable cutting insert 1 (in which the rake face 2 intersects the flank face 3 at an angle of 90° or more). FIG. 3 shows the negative indexable cutting insert 1 without a chip breaker. FIG. 4 shows the negative indexable cutting insert 1 with a chip breaker. FIGS. 5 and 6 are each a schematic cross-sectional view of the positive indexable cutting insert 1 (in which the rake face 2 intersects the flank face 3 at an acute angle). FIG. 5 shows the positive indexable cutting insert 1 without a chip breaker. FIG. 6 shows the positive indexable cutting insert 1 with a chip breaker.

Preferably, the thickness (total thickness of the inner sublayer and the outer sublayer) of the coating layer is in the range of 0.05 μm to 30 μm. A thickness of less than 0.05 μm results in an insufficient effect of improving characteristics such as wear resistance. A thickness exceeding 30 μm does not improve the characteristics and is thus disadvantageous in view of economic efficiency. However, if the economic efficiency is ignored, a thickness of 30 μm or more is allowable, and advantages of the present invention are exhibited. With respect to a method for measuring the thickness, for example, the thickness can be measured by cutting the indexable cutting insert and observing the section with a scanning electron microscope (SEM).

Preferably, at least part of the coating layer has a compressive stress. Thus, preferably, at least part of the inner sublayer or at least part of the outer sublayer has a compressive stress.

<Inner Sublayer>

The inner sublayer of the present invention is formed between the base and an outer sublayer so as to have one or more subsublayers. The inner sublayer has the effect of improving characteristics, such as wear resistance and toughness, of the indexable cutting insert. Preferably, the inner sublayer is usually formed so as to cover the entire base.

Each of the subsublayers constituting the inner sublayer may be composed of a compound containing at least one element selected from the group consisting of Group IVa elements, such as Ti, Zr, and Hf, Group Va elements, such as V, Nb, and Ta, Group VIa elements, such as Cr, Mo, and W, in the periodic table, Al, and Si, and at least one element selected from the group consisting of carbon, nitrogen, oxygen, and boron. The composition ratio (atomic ratio) in the compound is not necessarily limited to a ratio of the former element to the latter element of 1:1 as in the known art. When the proportion of the former element is defined as 1, the proportion of the latter element may be about 0.5 to 1 (for example, in the case of $Ti_aN_b$ where a+b=100 at %, b is in the range of about 35 to 50 at %). When the at least one latter element includes a plurality of elements, the atomic proportions of the elements are not necessarily limited to equal proportions. Any known atomic proportions may be selected. Therefore, in embodiments and the like described below, in the case where the compound is expressed, the atomic proportions of the elements constituting the compound may be desirably selected from the known atomic proportions unless otherwise specified.

More specifically, examples of the compound include TiC, TiN, TiCN, TiCNO, $TiB_2$, TiBN, TiBNO, TiCBN, ZrC, $ZrO_2$, HfC, HfN, TiAlN, AlCrN, CrN, VN, TiSiN, TiSiCN, AlTiCrN, TiAlCN, ZrCN, ZrCNO, AMN, AlCN, ZrN, and TiAlC.

Among the subsublayers constituting the inner sublayer, the uppermost subsublayer in contact with the outer sublayer needs to be composed of a compound containing Ti and at least one element selected from carbon, nitrogen, oxygen, and boron. This results in the significantly advantageous effect, in other words, this results in the significantly effective prevention of detachment of the outer sublayer described below, i.e., an alumina sublayer or a sublayer containing alumina. This is probably because extremely high adhesion is obtained between the alumina sublayer or the sublayer containing alumina and the compound containing Ti and at least one element selected from carbon, nitrogen, oxygen, and boron.

Examples of the compound containing Ti and at least one element selected from carbon, nitrogen, oxygen, and boron include TiN, TiCN, TiBN, TiCBN, TiBNO, TiNO, and TiCNO. The compound may have a non-stoichiometric composition.

Particularly preferably, the compound is titanium boronitride $TiB_XN_Y$ (wherein X and Y are each expressed in terms of atomic percent, and $0.001 < X/(X+Y) < 0.04$). Alternatively, the compound is titanium oxyboronitride $TiB_XN_YO_Z$ (wherein X, Y, and Z are each expressed in terms of atomic percent, $0.0005 < X/(X+Y+Z) < 0.04$ and $0 < Z/(X+Y+Z) < 0.5$).

The use of the compound results in particularly excellent adhesion to the alumina sublayer or the sublayer containing alumina.

With respect to $TiB_XN_Y$ described above, when $X/(X+Y)$ is 0.001 or less, in some cases, a satisfactory adhesion to the outer sublayer is not obtained. When $X/(X+Y)$ is 0.04 or more, reactivity to a workpiece is increased. The exposure of this sublayer at a surface causes a reaction with the workpiece, thereby forming a deposited substance. The deposited substance is strongly attached to the cutting edge, thereby possibly degrading appearance of the workpiece. More preferably, $X/(X+Y)$ is in the range of $0.003<X/(X+Y)<0.02$. In the above-described formula, the atomic ratio of Ti to the total of B and N need not necessarily be 1:1.

With respect to $TiB_XN_YO_Z$ described above, when $X/(X+Y+Z)$ is 0.0005 or less, in some cases, a satisfactory adhesion to the outer sublayer is not obtained. When $X/(X+Y+Z)$ is 0.0005 or more, reactivity to a workpiece is increased. The exposure of this sublayer at a surface causes a reaction with the workpiece, thereby forming a deposited substance. The deposited substance is strongly attached to the cutting edge, thereby possibly degrading appearance of the workpiece. More preferably, $X/(X+Y+Z)$ is in the range of $0.003<X/(X+Y+Z)<0.02$. When $Z/(X+Y+Z)$ is 0.5 or more, the hardness of the sublayer is increased. However, in some cases, toughness is reduced, thereby reducing resistance to fracture. More preferably, $Z/(X+Y+Z)$ is in the range of $0.0005<Z/(X+Y+Z)<0.3$. In the above-described formula, the atomic ratio of Ti to the total of B, N, and O need not be 1:1.

The inner sublayer may be formed by known chemical vapor deposition (CVD) or physical vapor deposition (PVD) including sputtering. The formation method is not limited thereto. For example, in the case where the indexable cutting insert is used for drilling and end milling, preferably, the inner sublayer is formed by PVD because transverse rupture strength is not reduced. The thickness of the inner sublayer may be controlled by controlling a deposition time.

When the inner sublayer is formed by known CVD, preferably, the inner sublayer includes a subsublayer formed by medium-temperature CVD (MT CVD). In particular, most suitably, the inner sublayer includes a titanium carbonitride (TiCN) subsublayer formed by the method, the subsublayer having excellent wear resistance. In known CVD, deposition is performed at about 1,020° C. to 1,030° C., in contrast, in MT-CVD, deposition can be performed at a relatively low temperature of about 850° C. to 950° C., thus reducing the damage to the base caused by heating during deposition. Consequently, the subsublayer formed by MT-CVD is preferably provided in close proximity to the base. The use of a nitrile gas, in particular, acetonitrile ($CH_3CN$), as a deposition gas preferred in view of high mass productivity. The use of a multilayer structure in which a subsublayer formed by MT-CVD and a subsublayer formed by high-temperature CVD (HT-CVD) (i.e., known CVD) are stacked may be preferred because the structure may improve adhesion between these subsublayers.

The thickness (total thickness of subsublayers in the case of the inner sublayer including two or more subsublayers) of the inner sublayer is preferably 0.05 μm to 30 μm. A thickness of less than 0.05 μm results in an insufficient effect of improving characteristics such as wear resistance. A thickness exceeding 30 μm does not improve the characteristics and is thus disadvantageous in view of economic efficiency. However, if the economic efficiency is ignored, a thickness of 30 μm or more is allowable, and advantages of the present invention are exhibited. With respect to a method for measuring the thickness, for example, the thickness can be measured by cutting the indexable cutting insert and observing the section with a scanning electron microscope (SEM).

In the inner sublayer, at least part of at least one subsublayer preferably has a compressive stress, thereby resulting in a more satisfactory effect of improving toughness. A method for imparting a compressive stress and a measurement method thereof may be performed as in the outer sublayer described below.

<Outer Sublayer>

The outer sublayer of the present invention is formed so as to have one or more subsublayers. The outer sublayer is an alumina sublayer or a sublayer containing alumina. In portions of the outer sublayer participating in cutting, when an average thickness on the flank face side is represented by A μm and an average thickness on the rake face side is represented by B μm, $A/B \leq 0.95$. The formation of the outer sublayer (outermost sublayer) that is the alumina sublayer or the sublayer containing alumina in such a manner that in the portions of the outer sublayer participating in cutting, the outer sublayer on the rake face side has a thickness larger than that on the flank face side, the thickness being a specified value or more, results in an excellent balance between wear resistance and toughness. In particular, a balance between the toughness of the cutting edge and wear resistance on the rake face side is successfully achieved.

The crystalline structure of alumina (aluminum oxide $Al_2O_3$) defined here is not particularly limited and may be any crystalline structure, e.g., $\alpha\text{-}Al_2O_3$, $\kappa\text{-}Al_2O_3$, or $\gamma\text{-}Al_2O_3$. Amorphous $Al_2O_3$ may be contained. Furthermore, a mixture thereof may be used. The phrase "containing alumina" means that at least part of the sublayer contains alumina (when the content of alumina is 50 percent by mass or more, it is deemed that the sublayer contains alumina). The remainder may be composed of the compound constituting the inner sublayer or $ZrO_2$ or $Y_2O_3$ (in this case, it may also be considered that Zr or Y is incorporated in alumina). Furthermore, chlorine, carbon, boron, nitrogen, and the like may be contained.

Preferably, at least part of the alumina sublayer or at least part of the sublayer containing alumina has a compressive stress, thereby effectively improving toughness. In this case, when the compressive stress on the flank face is larger than that on the rake face, toughness is further improved, thus being preferable.

Most preferably, a portion of the alumina sublayer or a portion of the sublayer containing alumina on a portion of the flank face participating in cutting has a compressive stress because this contributes most directly to the improvement of toughness.

The compressive stress introduced is preferably adjusted by forming the outer sublayer having a uniform thickness on the inner sublayer and then subjecting the outer sublayer to blasting, brushing, barrel treatment, or the like. In this way, the method including forming the outer sublayer having a uniform thickness and then subjecting the outer sublayer to blasting, brushing, barrel treatment, or the like is effective as a method of controlling the compressive stress. In blasting, irradiating the flank face with a slurry from a direction substantially perpendicular to the flank face effectively reduces the thickness of the outer sublayer disposed on the flank face to provide smooth surface roughness and is thus preferred. Alternatively, irradiating the flank face with a slurry from a direction at a predetermined angle to the flank face simultaneously processes a plurality of surfaces. Furthermore, the treatment generates a compressive stress in at least one sublayer constituting the coating layer, thereby advantageously improving the strength of the cutting edge.

The term "compressive stress" refers to a type of internal stress (inherent strain) present in the coating layer and refers to a stress represented by a negative ("−") numerical value (unit "GPa" used in the present invention). The concept that a compressive stress is high refers to a large absolute value of the above-described numerical value. The concept that a compressive stress is low refers to a small absolute value of the above-described numerical value. A tensile stress refers to a type of internal stress (inherent strain) present in the coating layer and refers to a stress represented by a positive ("+") numerical value (unit "GPa" in the present invention). The term "residual stress" includes both of the compressive stress and the tensile stress.

The absolute value of the compressive stress is preferably 0.1 GPa or more, more preferably 0.2 GPa or more, and still more preferably 0.5 GPa or more. At an absolute value of less than 0.1 GPa, sufficient toughness is not obtained, in some cases. An increase in the absolute value of the compressive stress is preferred in view of imparting toughness. However, at an absolute value exceeding 8 GPa, the coating layer may be detached and thus is not preferred.

The residual stress can be measured by a $\sin^2 \phi$ technique with an X-ray stress measurement device. The residual stress can be measured as follows: stress is measured by the $\sin^2 \phi$ technique at any 10 points (which are preferably selected so as to be 0.1 mm or more apart from each other so that the stress of the region of the sublayer can be represented) included in a region in the coating layer to which a compressive stress is imparted; and then the average value thereof is calculated.

Such a $\sin^2 \phi$ technique using X-rays has been widely used as the method for measuring the residual stress in polycrystalline materials. For example, the method which is described in detail on pages 54 to 67 in "X sen ouryoku sokuteihou (X-ray Stress Measurement Method)" (The Society of Materials Science, Japan, 1981, published by Yokendo Ltd.) may be used.

Furthermore, the residual stress can also be measured by a method using Raman spectroscopy. Such Raman spectroscopy is advantageous because it can carry out a local measurement of a narrow range, such as a spot diameter of 1 μm. The measurement of residual stress using Raman spectroscopy is commonly carried out. For example, the method described on pages 264 to 271 in "Hakumaku no rikigakuteki tokusei hyoka gijutsu (Techniques for evaluating dynamic properties of thin films)" (Sipec (the company name has been changed to Realize Advanced Technology Limited), published in 1992) can be employed.

Furthermore, the residual stress can also be measured with radiant light. This method has the advantage that a residual stress distribution can be determined in the thickness direction of the coating layer.

In the present invention, in a portion participating in cutting, while wear resistance on the rake face side in particular is maintained, toughness of the entire tip is improved successfully significantly by controlling the thickness of the outer sublayer in such a manner that the thickness of the outer sublayer on the rake face side is larger than that on the flank face side. That is, wear resistance is improved by increasing the thickness of the coating layer. Thus, a structure such that the effect is significantly exerted on the rake face side in particular is used. Toughness is improved by reducing the thickness of the coating layer. Thus, a structure such that the effect is significantly exerted on the flank face side where toughness is particularly required is used. Consequently, a combination of both structures successfully strikes a balance between the improvement of toughness and the improvement of wear resistance, which are conflicting characteristics.

The phrase "portion participating in cutting" means a portion expanding from a cutting edge with which a workpiece is usually brought into contact (or to which a workpiece is usually brought close) toward the flank face side with a width of 3 mm and toward the rake face side with a width of 3 mm. The portion varies in response to the shape of the indexable cutting insert, the type and of workpiece, the size of the workpiece, a method of machining, and the like.

Each of the average thickness A μm on the flank face side and the average thickness B μm on the rake face side refers to the average value of thicknesses at different 10 points in the portion. The same measurement method as above may be employed. For example, the thickness can be measured by cutting the indexable cutting insert and observing the section with a scanning electron microscope (SEM).

A/B is more preferably A/B≦0.9 and still more preferably A/B≦0.5. When A/B exceeds 0.95, the effect of striking a balance between wear resistance and toughness, in particular, the effect of improving wear resistance is not exerted. Even if A/B is 1 or less, the effect of striking the balance between wear resistance and toughness is not exerted when A/B exceeds 0.95. Preferably, the lower limit of A/B is 0.3 or more. When A/B is less than 0.3, the thickness of the outer sublayer disposed on the flank face side is excessively small, thereby disadvantageously degrading wear resistance on the flank face side.

The thickness of the outer sublayer is preferably controlled by forming the outer sublayer having a uniform, relatively large thickness on the inner sublayer and then subjecting the outer sublayer to blasting, brushing, barrel treatment, or the like. As another method for controlling the thickness of the outer sublayer, for example, a method for forming the outer sublayer while the thickness is directly controlled may be employed. However, it is difficult to directly form the outer sublayer having a uniform, small thickness on the entirety of a region. Thus, as described above, the employment of the method including forming the outer sublayer having a uniform, relatively large thickness and then subjecting the outer sublayer to blasting or brushing is particularly effective. In blasting, irradiating the flank face with a blast from a direction substantially perpendicular to the flank face effectively reduces the thickness of the outer sublayer disposed on the flank face and is thus preferred. Alternatively, irradiating the flank face with a blast from a direction at a predetermined angle to the flank face simultaneously processes a plurality of surfaces.

Figure 10:
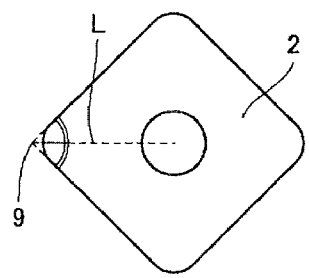
FIG. 10 is a plan view showing a line L bisecting an angle defined by two flank faces of an indexable cutting insert.
Figure 11:
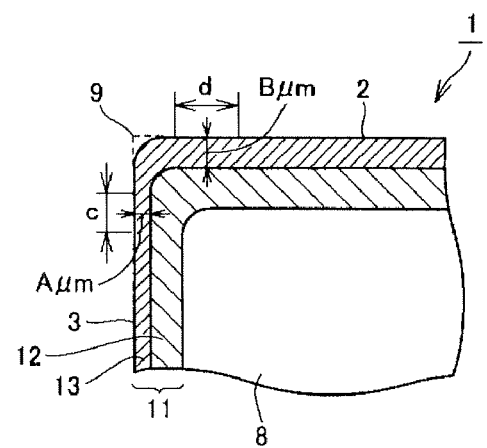
FIG. 11 is a schematic cross-sectional view taken along the line L in FIG. 10.

As shown in FIGS. 10 and 11, on a line L (the line L lies only on the rake face 2 in FIG. 10 but extends to an edge (when cutting edge is treated as shown in the drawings, a portion located in the middle of the rounded corner is defined as a hypothetical edge) where the two flank faces intersect each other) passing through the corner 9 (a hypothetical corner when cutting edge is treated as shown in the drawings) participating in cutting and bisecting an angle defined by the two flank faces constituting the corner 9, the line lying on the rake face 2 and extending to an edge where the two flank faces 3 intersect each other, when the average thickness of the outer sublayer in a segment region c from 0.5 mm to 1 mm apart from the corner 9 toward one of the flank faces 3 is defined as A μm, and when the average thickness of the outer sublayer in a segment region d from 0.5 mm to 1 mm apart from the corner 9 toward the rake face 2 is defined as B μm, A/B≦0.95, which is most preferable. The requirements enable the balance between wear resistance and toughness to be effectively achieved. In particular, it is significantly effective in striking a balance between the toughness of the cutting edge and wear resistance on the rake face side.

The phrase "corner participating in cutting" includes a corner with which a workpiece is actually brought into contact (or to which a workpiece is brought close) and includes the case where a workpiece is in contact with an edge line near a corner and the corner participates substantially in cutting (for example, the case where temperature is increased). However, a corner in which chips of a workpiece are scattered and come into contact with the corner during cutting is not included.

In the case where the corner and the edge are subjected to edge treatment, when a line passing through the intermediate portion of the round corner connecting the two flank faces is defined as a hypothetic edge, the phrase "edge where two flank faces intersect each other" refers to a line connecting the hypothetic edge and the hypothetic corner (see FIGS. 10 and 11)

The segment regions c and d are each defined as ranges 0.5 mm to 1 mm. This is because the probability that chips of a workpiece formed by cutting and having a significantly high temperature come into contact with the specified regions is high and it is speculated that characteristics such as wear resistance and toughness are most affected.

A/B is more preferably A/B≦0.9 and still more preferably A/B≦0.5. When A/B exceeds 0.95, striking a balance between wear resistance and toughness cannot be achieved. Even if A/B is 1 or less, striking the balance between wear resistance and toughness is not achieved when A/B exceeds 0.95. This is probably for the same reason as above. Preferably, the lower limit of A/B is 0.3 or more. When A/B is less than 0.3, the thickness of the outer sublayer disposed on the flank face side is excessively small, thereby disadvantageously degrading wear resistance on the flank face side.

Each of the average thickness A μm in the segment region c and the average thickness B μm in the segment region d refers to the average value of thicknesses at different 10 points in the corresponding segment region. The same measurement method as above may be employed. In the case where a plurality of corners are present in the indexable cutting insert, it is necessary to hold the relationship of A/B for all corners possibly participating in cutting.

The outer sublayer may be formed by known chemical vapor deposition (CVD) or physical vapor deposition (PVD) including sputtering. The formation method is not limited thereto.

The outer sublayer of the present invention functions as the outermost sublayer of the indexable cutting insert, except for a portion where the outer sublayer is not formed on part or the entirety of an edge line portion participating in cutting (that is, the inner sublayer is exposed at the surface), as described below. The outer sublayer has the effect of striking the balance between wear resistance and toughness as described above. Another layer may be formed on the outer sublayer to the extent that such a satisfactory effect is not impaired. Examples of the layer include layers each composed of TiN, TiCN, ZrN, ZrCN, TiAlN, TiAlCN, TiSiCN, TiSiN, Cr, Al, CrN, AlN, and VN. However, the layer needs to be removed from a portion participating in cutting. In the portion, the alumina sublayer or the sublayer containing alumina needs to constitute the surface sublayer.

The thickness (total thickness of subsublayers in the case of the outer sublayer including two or more subsublayers) of the outer sublayer is preferably 0.05 μm to 15 μm and more preferably 0.1 μm to 10 μm. A thickness of less than 0.05 μm results in industrial difficulty in uniformly forming the outer sublayer on a predetermined portion. A thickness exceeding 30 μm does not improve the characteristics and is thus disadvantageous in view of economic efficiency. The same measurement method as above may be employed.

Figure 7:
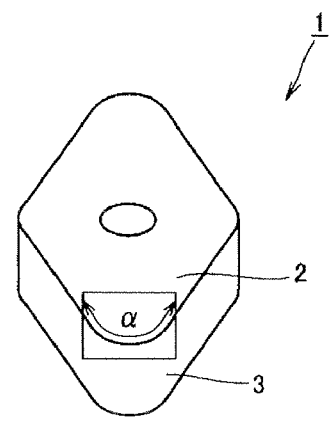
FIG. 7 is a schematic view showing the length of a cutting edge of an indexable cutting insert.
Figure 8:
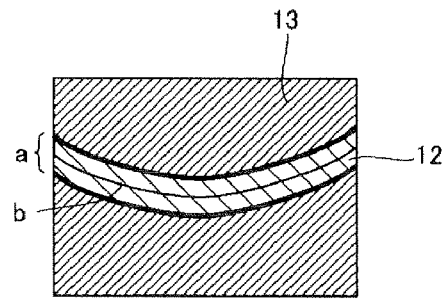
FIG. 8 is a schematic view of the enlarged scanning electron micrograph of the range α in FIG. 7.
Figure 9:
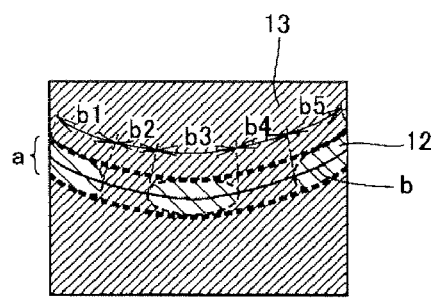
FIG. 9 is another schematic view of the enlarged scanning electron micrograph of the range α in FIG. 7.

Preferably, the outer sublayer is not formed on part or the entirety of the edge line portion participating in cutting, as shown in FIGS. 7 to 9. The absence of the outer sublayer, which is the alumina sublayer or the sublayer containing alumina, disposed on such a specific portion advantageously provides a more satisfactory effect, i.e., more satisfactory resistance to deposition.

The phrase "edge line portion participating in cutting" includes an edge line with which a workpiece is actually brought into contact (or to which a workpiece is brought close) and includes the case where a workpiece is in contact with an edge line and the edge line participates substantially in cutting (for example, the case where temperature is increased). However, an edge line in which chips of a workpiece are scattered and come into contact with the corner during cutting is not included.

The edge line portion refers to a region indicated as a region a shown in FIGS. 8 and 9. More specifically, the edge line portion refers to a region expanding from the edge line (a hypothetic edge when edge treatment described above is performed) toward the flank face with a width of 2,000 μm or less and toward the rake face with a width of 2,000 μm or less. This region may naturally include the corner and may be part of the portion participating in cutting.

With respect to determination of the absence of the formation of the outer sublayer, when the outer sublayer is absent in a region of 10% or more of the length of a cutting edge in the edge line portion participating in cutting, it is deemed that the outer sublayer is not formed. In this case, the above-described satisfactory effect is exerted. The region where the outer sublayer is absent is preferably 50% or more and more preferably 100% (that is, the entire region). Expanding the region improves the effect. The term "length of the cutting edge" refers to a length in a direction parallel to the edge line of the edge line portion participating in cutting.

A more specific method for the determination of the absence of the formation of the outer sublayer includes observing the indexable cutting insert with a scanning electron microscope and taking a micrograph such that a state of the outer sublayer in the edge line portion is identified. A line parallel to the edge line corresponding to the length of the cutting edge is drawn on the micrograph. The proportion of a region where the outer sublayer is not present on the line is expressed as percentage.

FIGS. 7 to 9 specifically illustrate the method (a schematic view of the scanning electron micrograph). The range α in FIG. 7 indicates the length of the cutting edge. FIGS. 8 and 9 are each an enlarged view of the range α. FIG. 8 shows the case where the outer sublayer is not formed on the entirety of the edge line portion participating in cutting. FIG. 9 shows the case where the outer sublayer is not formed on part of the edge line portion participating in cutting.

In each of FIGS. 8 and 9, a line b parallel to the edge line is drawn. The length of a portion where the outer sublayer is not formed on the line b is measured. In FIG. 8, no outer sublayer is present on the line b. Thus, the range in which the outer sublayer is not formed is 100% (entirety). In FIG. 9, portions (b1, b3, and b5) where the outer sublayer is not formed on the line b are present. The percentage calculated with (b1+b3+b5)/(b1+b2+b3+b4+b5) is the proportion of the range in which the outer sublayer is not formed. A line passing through the center of the edge line portion is selected as the line b.

The inner sublayer is exposed at the surface in the range in which the outer sublayer is not formed. The exposed portion of the inner sublayer may be formed of the uppermost subsublayer of the inner sublayer. Alternatively, the exposed portion may have a structure in which the subsublayers disposed below the uppermost subsublayer are concentrically exposed.

As a method for forming the region where the outer sublayer is not formed, any of known methods may be employed. The method is not particularly limited thereto. For example, the region may be formed by forming the outer sublayer on the inner sublayer and then removing the outer sublayer disposed on the predetermined region where the outer sublayer is not formed by blasting, brushing, barrel treatment, or the like. However, the method is not limited to only such a method.

EXAMPLES

The present invention will be described in further detail with reference to examples, but the present invention si not limited to these examples.

Example 1

A cemented carbide powder with a composition containing 1.6 percent by mass of TiC, 0.8 percent by mass of TaC, 1.0 percent by mass of NbC, 6.0 percent by mass of Co, and the remainder of WC was pressed, sintered at 1,450° C. for 1 hour in a vacuum atmosphere, and then subjected to smooth polishing and edge processing of edge lines with a SiC brush (horning of a width of 0.05 mm from the rake face side) to prepare a cemented carbide tip as a base having the same shape as a cutter insert CNMA120408 (JIS B 4120:1998). The base did not have a β-free layer on the surface thereof. The base had two rake faces and four flank faces, each rake face and each flank face being connected with an edge line (a hypothetical line because the edge processing had been performed) provided therebetween. The base had a total of eight edge lines. In addition, a point of intersection of two flank faces and one rake face was a corner (a hypothetical point of intersection because the edge processing had been performed). The base had a total of eight corners (however, in the tip used herein, the corners each having a vertex angle of 80° when viewed from the top surface or the bottom surface are often used for cutting; hence, in this case, the number of corners may be considered to be four).

The layers described below were formed on the entire surface of the base by known thermal CVD. That is, the base was overlaid with a TiN subsublayer having a thickness of 0.2 μm, a TiCN subsublayer having a thickness of 6.4 μm (formed by MT-CVD), a TiCN subsublayer having a thickness of 1.0 μm (formed by HT-CVD), and a TiBN subsublayer having a thickness of 0.3 μm (TiB$_X$N$_Y$, X/(X+Y)=0.016), which constituted an inner sublayer; and an α-alumina (α-Al$_2$O$_3$) subsublayer having a thickness of 3.6 μm on the TiBN subsublayer as the uppermost subsublayer of the inner sublayer, and a TiN subsublayer having a thickness of 0.5 μm, which constituted an outer sublayer, in that order from the surface side of the base (the resulting coating layer was defined as coating layer No. 1).

Similarly, the entire surface of the base was overlaid with each of coating layer Nos. 2 to 7 shown in Table I instead of coating layer No. 1.

In Table I, the subsublayers of the inner sublayer were stacked on the surface of the base in the order from the left. All of the subsublayers were formed by known thermal CVD (the subsublayers with the expression MT-CVD were formed by MT-CVD at a deposition temperature of 880° C., and the subsublayer with the expression HT-CVD was formed by HT-CVD at a deposition temperature of 980° C.).

The bases having the coating layers were processed by eight processing methods A to H below using known blasting (abrasive particles: alumina sand No. 120 (average particle diameter: 100 μm), pressure: 0.25 MPa), brushing (using diamond sand), or a barrel method.

(Processing Method A)
The coating was not processed by blasting or brushing.

(Processing Method B)
The coating was processed by brushing in such a manner that the outer sublayer had an average thickness shown in each of Tables II and III.

(Processing Method C)
The coating was processed by blasting in such a manner that the outer sublayer had an average thickness shown in each of Tables II and III.

(Processing Method D)
The coating was processed by brushing and then blasting in such a manner that the outer sublayer had an average thickness shown in each of Tables II and III.

(Processing Method E)
The coating was processed by blasting and then brushing in such a manner that the outer sublayer had an average thickness shown in each of Tables II and III.

(Processing Method F)
The coating was processed by brushing and then the barrel method in such a manner that the outer sublayer had an average thickness shown in each of Tables II and III.

(Processing Method G)
The coating was processed by blasting and then the barrel method in such a manner that the outer sublayer had an average thickness shown in each of Tables II and III.

(Processing Method H)
The coating was processed by the barrel method and then blasting in such a manner that the outer sublayer had an average thickness shown in each of Tables II and III.

In Tables II and III, as shown in FIG. 11, on a line passing through a corner (namely, a corner subjected to cutting test below) participating in cutting and bisecting an angle defined by the two flank faces constituting the corner, the line lying on the rake face and extending to an edge where the two flank faces intersect each other, the average thickness of the outer sublayer in a segment region c from 0.5 mm to 1 mm apart

TABLE I

| | Coating layer | |
|---|---|---|
| No. | Inner sublayer | Outer sublayer |
| 1 | TiN (0.2 μm)/TiCN (MT-CVD, 6.4 μm)/TiCN (HT-CVD, 1.0 μm)/TiBN (0.3 μm) | α-Al$_2$O$_3$ (3.6 μm)/TiN (0.5 μm) |
| 2 | TiC (1.1 μm)/TiCN (MT-CVD, 5.1 μm)/TiN (0.3 μm) | κ-Al$_2$O$_3$ (2.0 μm) |
| 3 | TiN (0.3 μm)/TiCN (MT-CVD, 2.9 μm)/TiC (1.4 μm)/TiBN (0.3 μm) | κ-Al$_2$O$_3$ (1.9 μm) |
| 4 | TiN (0.4 μm)/TiCN (3.8 μm)/TiCNO (0.2 μm) | α-Al$_2$O$_3$ (2.7 μm) |
| 5 | TiN (0.3 μm)/TiCN (MT-CVD, 3.5 μm)/TiBN (0.5 μm) | α-Al$_2$O$_3$ (2.5 μm) |
| 6 | TiN (0.3 μm)/TiCN (MT-CVD, 6.8 μm)/TiCBN (0.5 μm) | α-Al$_2$O$_3$ (7.6 μm) |
| 7 | TiN (0.4 μm)/TiCN (MT-CVD, 4.0 μm)/TiBNO (0.4 μm) | α-Al$_2$O$_3$ (2.4 μm) |

(Remarks)
TiBN (No. 3) is TiB$_X$N$_Y$ (X/(X + Y) = 0.028).
TiCNO (No. 4) is TiC$_X$N$_Y$O$_Z$ (X/(X + Y + Z) = 0.67 and Z/(X + Y + Z) = 0.06).
α-Al$_2$O$_3$ (No. 4) contains 0.22 mass % Zr (measured by electron probe microanalysis (EPMA)).
TiBN (No. 5) is TiB$_X$N$_Y$ (X/(X + Y) = 0.011).
TiCBN (No. 6) is TiC$_X$B$_Y$N$_Z$ (Y/(X + Y + Z) = 0.011 and X/(X + Y + Z) = 0.41).
TiBNO (No. 7) is TiB$_X$N$_Y$O$_Z$ (X/(X + Y + Z) = 0.030 and Z/(X + Y + Z) = 0.18).

from the corner toward one of the flank faces is defined as A μm, and when the average thickness of the outer sublayer in a segment region d from 0.5 mm to 1 mm apart from the corner toward the rake face is defined as B μm, and then A/B was determined.

In the indexable cutting insert including coating layer No. 1, the TiN subsublayer formed on the outer sublayer was completely removed in regions expanding from the edge line to the segment regions c and d, except for the tip Nos. 1 and 14. In the tip Nos. 1 and 14, the TiN subsublayer was formed in the regions expanding from the edge line to the segment regions c and d, and the thickness shown was indicated as the thickness of the TiN subsublayer alone.

In Tables II and III, the phrase "rate of removal" refers to the percentage of the absence of the outer sublayer determined by the above-described method in the edge line portion (the length of the cutting edge is defined as 50 μm, and the line b is drawn in the center of the region a as shown in FIG. 9) participating in cutting. The region where the outer sublayer was not formed was formed by removing the outer sublayer disposed on the region by the above-described processing method.

As described above, 32 types of indexable cutting insert Nos. 1 to 32 shown in Tables II and III below were produced. The sample numbers with asterisks "*" indicate that the samples were in the range of the present invention, and the other samples were comparative examples.

A tuning test was conducted for each of the indexable cutting insert Nos. 1 to 32 under the conditions below to measure the amount of flank face wear and the rate of fracture of each indexable cutting insert (the amount of flank face wear was measured by a wear resistance test, and the rate of fracture was measured by a toughness test). In the wear resistance test, a state of deposition of a workpiece to the cutting edge and a state of the processed surface of the workpiece after turning for one minute were observed. Tables II and III show the results. A smaller amount of flank face wear indicates satisfactory wear resistance. A smaller rate of fracture indicates more satisfactory toughness. A larger amount of deposition of the workpiece to the cutting edge indicates that the surface roughness of the workpiece is degraded. A processed surface close to a mirror surface indicates that the workpiece has an excellent processed surface.

<Conditions of Turning Test>
(Wear Resistance Test)
Workpiece: FCD500 bar
Cutting speed: 220 m/min
Feed: 0.35 mm/rev.
Depth of cut: 2.0 mm
Cutting oil: none
Cutting time: 15 minutes
(Toughness Test)
Workpiece: FCD450 grooved bar
Cutting speed: 200 m/min
Feed: 0.45 mm/rev.
Depth of cut: 2.0 mm
Cutting oil: water-soluble oil
Cutting time: 30 seconds
Evaluation: the rate of fracture is determined from the number of fracture (the number of fractured cutting edges) when 20 cutting edges were used for cutting for 30 seconds (namely, the rate of fracture (%)=the number of fracture/20×100).

TABLE II

| | Cutter insert No. | Coating layer No. | Processing method | Outer sublayer A μm | Outer sublayer B μm | A/B | Rate of removal (%) | Amount of flank wear (mm) | Rate of fracture (%) | Deposition of workpiece to edge | State of processed surface of workpiece |
|---|---|---|---|---|---|---|---|---|---|---|---|
| | 1 | 1 | A | 0.5 (TiN) | 0.5 (TiN) | 1.00 | 0 | 0.216 | 100 | Large | Clouded |
| | 2 | 2 | A | 2.0 | 2.0 | 1.00 | 0 | 0.226 | 85 | None | Substantially mirror surface |
| | 3 | 3 | A | 1.9 | 1.9 | 1.00 | 0 | 0.218 | 85 | None | Substantially mirror surface |
| | 4 | 4 | A | 2.7 | 2.7 | 1.00 | 0 | 0.213 | 95 | None | Substantially mirror surface |
| | 5 | 5 | A | 2.5 | 2.5 | 1.00 | 0 | 0.218 | 85 | None | Substantially mirror surface |
| | 6 | 6 | A | 7.6 | 7.6 | 1.00 | 0 | 0.166 | 90 | None | Substantially mirror surface |
| | 7 | 7 | A | 2.4 | 2.4 | 1.00 | 0 | 0.215 | 80 | None | Substantially mirror surface |
| | 8 | 1 | B | 3.3 | 3.4 | 0.97 | 0 | 0.203 | 85 | None | Substantially mirror surface |
| * | 9 | 1 | E | 2.7 | 3.2 | 0.85 | 0 | 0.197 | 55 | None | Substantially mirror surface |
| * | 10 | 1 | E | 1.8 | 3.3 | 0.54 | 0 | 0.198 | 45 | None | Substantially mirror surface |
| * | 11 | 1 | D | 2.6 | 3.5 | 0.74 | 0 | 0.204 | 50 | None | Substantially mirror surface |
| * | 12 | 1 | D | 1.6 | 3.2 | 0.50 | 0 | 0.192 | 45 | None | Substantially mirror surface |
| * | 13 | 1 | C | 1.0 | 3.0 | 0.34 | 0 | 0.205 | 40 | None | Substantially mirror surface |
| | 14 | 1 | C | 0.4 (TiN) | 0.5 (TiN) | 0.80 | 0 | 0.206 | 90 | Slightly large | Slightly clouded |
| * | 15 | 2 | B | 1.8 | 2.1 | 0.86 | 0 | 0.216 | 40 | None | Substantially mirror surface |
| * | 16 | 2 | C | 1.4 | 2.1 | 0.67 | 0 | 0.209 | 40 | None | Substantially mirror surface |

TABLE III

| | Cutter insert No. | Coating layer No. | Processing method | Outer sublayer A μm | Outer sublayer B μm | A/B | Rate of removal (%) | Amount of flank wear (mm) | Rate of fracture (%) | Deposition of workpiece to edge | State of processed surface of workpiece |
|---|---|---|---|---|---|---|---|---|---|---|---|
| * | 17 | 3 | B | 0.7 | 1.6 | 0.44 | 0 | 0.212 | 35 | None | Substantially mirror surface |
| * | 18 | 3 | C | 1 | 1.6 | 0.63 | 0 | 0.210 | 40 | None | Substantially mirror surface |
| * | 19 | 4 | B | 1.7 | 2.5 | 0.68 | 0 | 0.205 | 45 | None | Substantially mirror surface |
| * | 20 | 4 | C | 2 | 2.5 | 0.80 | 0 | 0.190 | 35 | None | Substantially mirror surface |
| * | 21 | 5 | B | 1.5 | 2 | 0.75 | 0 | 0.216 | 35 | None | Substantially mirror surface |

TABLE III-continued

| | Cutter insert No. | Coating layer No. | Processing method | Outer sublayer A μm | Outer sublayer B μm | A/B | Rate of removal (%) | Amount of flank wear (mm) | Rate of fracture (%) | Deposition of workpiece to edge | State of processed surface of workpiece |
|---|---|---|---|---|---|---|---|---|---|---|---|
| * | 22 | 5 | C | 1.2 | 2 | 0.60 | 0 | 0.204 | 40 | None | Substantially mirror surface |
| * | 23 | 6 | B | 6.2 | 7.6 | 0.82 | 0 | 0.179 | 35 | None | Substantially mirror surface |
| * | 24 | 6 | C | 6 | 7.6 | 0.79 | 0 | 0.161 | 35 | None | Substantially mirror surface |
| * | 25 | 7 | B | 1.7 | 2.4 | 0.71 | 0 | 0.201 | 40 | None | Substantially mirror surface |
| * | 26 | 7 | C | 1.1 | 2.1 | 0.52 | 0 | 0.222 | 35 | None | Substantially mirror surface |
| * | 27 | 5 | D | 2.1 | 2.3 | 0.91 | 13 | 0.202 | 35 | None | Substantially mirror surface |
| * | 28 | 5 | F | 1.6 | 2.1 | 0.76 | 23 | 0.178 | 30 | None | Substantially mirror surface |
| * | 29 | 5 | G | 1.4 | 2.3 | 0.61 | 36 | 0.166 | 20 | None | Substantially mirror surface |
| * | 30 | 5 | H | 1.2 | 2.3 | 0.52 | 58 | 0.143 | 15 | None | Substantially mirror surface |
| * | 31 | 5 | E | 1.2 | 2.1 | 0.57 | 78 | 0.154 | 10 | None | Substantially mirror surface |
| * | 32 | 5 | G | 1.3 | 2.2 | 0.59 | 100 | 0.161 | 5 | None | Substantially mirror surface |

As is apparent from Tables II and III, each inventive indexable cutting insert in which A/B determined from the average thicknesses A μm and B μm of the outer sublayer was 0.95 or less had a satisfactory amount of flank wear and a satisfactory rate of fracture compared with those in comparative examples, and each inventive indexable cutting insert had an excellent balance between wear resistance and toughness. In each indexable cutting insert not having the alumina subsublayer but having the TiN subsublayer on the surface thereof, the workpiece was deposited on the cutting edge, and the processed workpiece was clouded.

As described above, each of the indexable cutting inserts of the present invention clearly has a satisfactory effect compared with the indexable cutting inserts in the comparative examples. The indexable cutting insert of the present invention had an excellent balance between wear resistance (on the rake face side in particular) and toughness (cutting edge in particular). In this example, the indexable cutting inserts each having a chip breaker were described. As described in examples below, the present invention is also effective for an indexable cutting insert without a chip breaker.

Example 2

A cemented carbide powder with a composition containing 0.7 percent by mass of TiC, 5.0 percent by mass of Co, and the remainder of WC was pressed, sintered at 1,450° C. for 1 hour in a vacuum atmosphere, and then subjected to smooth polishing and edge processing of edge lines with a SiC brush (horning of a width of 0.05 mm from the rake face side) to prepare a cemented carbide tip as a base having the same shape as a cutter insert CNMA120408N-UX (manufactured by Sumitomo Electric Hardmetal Corp.). The base did not have a chip breaker have a β-free layer having a thickness of 15 μm on the surface thereof. The base had two rake faces and four flank faces, each rake face and each flank face being connected with an edge line (a hypothetical line because the edge processing had been performed) provided therebetween. The base had a total of eight edge lines. In addition, a point of intersection of two flank faces and one rake face was a corner (a hypothetical point of intersection because the edge processing had been performed). The base had a total of eight corners (however, in the tip used herein, the corners each having a vertex angle of 80° when viewed from the top surface or the bottom surface are often used for cutting; hence, in this case, the number of corners may be considered to be four).

As shown in Table IV below, the same layers as in EXAMPLE 1 were formed on the entire surface of the base (that is, the coating layer numbers in Table IV indicate the coating layer numbers in EXAMPLE 1).

The bases having the coating layers were processed by the same processing methods in EXAMPLE 1. In Table IV, the thickness of the outer sublayer, A/B, and the rate of removal were determined by the same way as in EXAMPLE 1. In the indexable cutting insert including coating layer No. 1, the TiN subsublayer formed on the outer sublayer was completely removed in regions expanding from the edge line to the segment regions c and d, except for the tip No. 33. In the tip No. 33, the TiN subsublayer was formed in the regions expanding from the edge line to the segment regions c and d, and the thickness shown was indicated as the thickness of the TiN subsublayer alone.

As described above, 20 types of indexable cutting insert Nos. 33 to 52 shown in Table IV below were produced. The sample numbers with asterisks "*" indicate that the samples were in the range of the present invention, and the other samples were comparative examples.

A tuning test was conducted for each of the indexable cutting insert Nos. 33 to 52 under the conditions below to measure the amount of flank wear and the rate of fracture of each indexable cutting insert. In the wear resistance test, a state of deposition of a workpiece to the cutting edge and a state of the processed surface of the workpiece after turning for five minute were observed. Table IV shows the results.

<Conditions of Turning Test>

(Wear Resistance Test)

Workpiece: FCD500 bar

Cutting speed: 230 m/min

Feed: 0.3 mm/rev.

Depth of cut: 1.5 mm

Cutting oil: water-soluble oil

Cutting time: 5 minutes (Toughness Test)

Workpiece: FCD700 grooved bar

Cutting speed: 180 m/min

Feed: 0.40 mm/rev.

Depth of cut: 2.0 mm

Cutting oil: none

Cutting time: 30 seconds

Evaluation: the rate of fracture is determined from the number of fracture when 20 cutting edges were used for cutting for 30 seconds.

TABLE IV

| Cutter insert No. | Coating layer No. | Processing method | Outer sublayer A μm | Outer sublayer B μm | A/B | Rate of removal (%) | Amount of flank wear (mm) | Rate of fracture (%) | Deposition of workpiece to edge | State of processed surface of workpiece |
|---|---|---|---|---|---|---|---|---|---|---|
|  | 33 | 1 | A | 0.5 (TiN) | 0.5 (TiN) | 1.00 | 0 | 0.261 | 100 | Large | Clouded |
|  | 34 | 2 | A | 2.0 | 2.0 | 1.00 | 0 | 0.309 | 95 | Large | Clouded |
|  | 35 | 4 | A | 2.7 | 2.7 | 1.00 | 0 | 0.238 | 95 | Large | Clouded |
|  | 36 | 5 | A | 2.5 | 2.5 | 1.00 | 0 | 0.265 | 95 | Large | Clouded |
|  | 37 | 7 | A | 2.7 | 2.7 | 1.00 | 0 | 0.272 | 90 | Large | Clouded |
| * | 38 | 1 | C | 1.7 | 3.3 | 0.52 | 0 | 0.250 | 60 | None | Lustrous |
|  | 39 | 1 | B | 3.2 | 3.2 | 1.00 | 0 | 0.261 | 95 | None | Lustrous |
| * | 40 | 2 | C | 1.9 | 2.2 | 0.86 | 0 | 0.305 | 60 | None | Lustrous |
| * | 41 | 2 | B | 1.2 | 1.8 | 0.67 | 0 | 0.294 | 50 | None | Lustrous |
| * | 42 | 2 | C | 0.5 | 1.7 | 0.29 | 0 | 0.286 | 55 | None | Lustrous |
| * | 43 | 4 | B | 2.1 | 2.7 | 0.78 | 0 | 0.219 | 50 | None | Lustrous |
| * | 44 | 4 | C | 1.2 | 2.6 | 0.46 | 0 | 0.232 | 55 | None | Highly lustrous |
| * | 45 | 5 | B | 1.4 | 2.0 | 0.70 | 0 | 0.242 | 50 | None | Lustrous |
| * | 46 | 5 | C | 0.8 | 1.9 | 0.42 | 0 | 0.237 | 45 | None | Lustrous |
| * | 47 | 7 | C | 2.1 | 2.4 | 0.88 | 12 | 0.267 | 45 | None | Lustrous |
| * | 48 | 7 | F | 1.9 | 2.4 | 0.79 | 27 | 0.239 | 50 | None | Highly lustrous |
| * | 49 | 7 | G | 2.0 | 2.3 | 0.87 | 39 | 0.237 | 40 | None | Lustrous |
| * | 50 | 7 | G | 2.0 | 2.3 | 0.87 | 62 | 0.237 | 30 | None | Lustrous |
| * | 51 | 7 | G | 2.0 | 2.3 | 0.87 | 79 | 0.220 | 25 | None | Highly lustrous |
| * | 52 | 7 | G | 2.0 | 2.3 | 0.87 | 100 | 0.213 | 20 | None | Lustrous |

As is apparent from Table IV, each inventive indexable cutting insert in which A/B determined from the average thicknesses A μm and B μm of the outer sublayer was 0.95 or less had a satisfactory amount of flank wear and a satisfactory rate of fracture compared with those in comparative examples, and each inventive indexable cutting insert had an excellent balance between wear resistance and toughness. In each indexable cutting insert not having the alumina subsublayer but having the TiN subsublayer on the surface thereof, the workpiece was deposited on the cutting edge, and the processed workpiece was clouded.

As described above, each of the indexable cutting inserts of the present invention clearly has a satisfactory effect compared with the indexable cutting inserts in the comparative examples. The indexable cutting insert of the present invention had an excellent balance between wear resistance (on the rake face side in particular) and toughness (cutting edge in particular).

Example 3

A cemented carbide powder with a composition containing 1.2 percent by mass of TaC, 10.0 percent by mass of Co, and the remainder of WC was pressed, sintered at 1,400° C. for 1 hour in a vacuum atmosphere, and then subjected to smooth polishing and edge processing of edge lines with a SiC brush (horning of a width of 0.05 mm from the rake face side) to prepare a cemented carbide tip as a base having the same shape as a cutter insert SEMT13T3AGSN-G (manufactured by Sumitomo Electric Hardmetal Corp.). The base did not have a β-free layer. The base had one rake faces and four flank faces, each rake face and each flank face being connected with an edge line (a hypothetical line because the edge processing had been performed) provided therebetween. The base had a total of four edge lines. In addition, a point of intersection of two flank faces and one rake face was a corner (a hypothetical point of intersection because the edge processing had been performed). The base had a total of four corners.

The layers described below were formed on the entire surface of the base by known thermal CVD. That is, the base was overlaid with a TiN subsublayer having a thickness of 0.3 μm, a TiCN subsublayer having a thickness of 2.4 μm (formed by MT-CVD), and a TiBN subsublayer having a thickness of 0.3 μm (TiB$_X$N$_Y$, X/(X+Y)=0.028), which constituted an inner sublayer; and an α-alumina (α-Al$_2$O$_3$) subsublayer having a thickness of 2.1 μm on the TiBN subsublayer as the uppermost subsublayer of the inner sublayer, and a TiN subsublayer having a thickness of 0.6 μm the resulting coating layer was defined as coating layer No. 8).

Similarly, the entire surface of the base was overlaid with each of coating layer Nos. 8 to 13 shown in Table V instead of coating layer No. 8.

TABLE V

| | Coating layer | |
|---|---|---|
| No. | Inner sublayer | Outer sublayer |
| 8 | TiN (0.3 μm)/TiCN (MT-CVD, 2.4 μm)/TiBN (0.3 μm) | α-Al$_2$O$_3$ (2.1 μm)/TiN (0.6 μm) |
| 9 | TiN (0.4 μm)/TiCN (MT-CVD, 3.1 μm)/TiCN (HT-CVD, 0.9 μm)/TiBN (0.3 μm) | κ-Al$_2$O$_3$ (2.1 μm) |
| 10 | TiN (0.3 μm)/TiCN (MT-CVD, 2.6 μm)/TiBNO (0.6 μm) | α-Al$_2$O$_3$ (2.4 μm) |
| 11 | TiN (0.7 μm)/TiCN (MT-CVD, 4.4 μm)/TiBN (0.4 μm) | α-Al$_2$O$_3$ (2.3 μm) |
| 12 | TiAlN (2.1 μm)/TiN (0.4 μm) | α-Al$_2$O$_3$ (1.7 μm) |
| 13 | CrAlN (3.1 μm)/TiN (0.3 μm) | κ-Al$_2$O$_3$ (1.5 μm) |

(Remarks)
TiBN (No. 9) is TiB$_X$N$_Y$ (X/(X + Y) = 0.010).
TiBNO (No. 10) is TiB$_X$N$_Y$O$_Z$ (X/(X + Y + Z) = 0.014 and Z/(X + Y + Z) = 0.21).
TiBN (No. 11) is TiB$_X$N$_Y$ (X/(X + Y) = 0.030).
α-Al$_2$O$_3$ (No. 11) contains 1.9 mass % Zr (measured by electron probe microanalysis (EPMA)).

In Table V, the subsublayers of the inner sublayer were stacked on the surface of the base in the order from the left. The coating layer Nos. 8 to 11 were formed by known thermal CVD as in the coating layer No. 7. The coating layer Nos. 12 and 13 were formed by known PVD.

The bases having the coating layers were processed by the same processing methods in EXAMPLE 1.

As described above, 25 types of indexable cutting insert Nos. 53 to 77 shown in Tables VI and VII below were produced. The sample numbers with asterisks "*" indicate that the samples were in the range of the present invention, and the other samples were comparative examples. In Tables VI and VII, the thickness of the outer sublayer, A/B, and the rate of removal were determined by the same way as in EXAMPLE 1. In the indexable cutting insert including coating layer No. 8, the TiN subsublayer formed on the outer sublayer was completely removed in regions expanding from the edge line to the segment regions c and d, except for the tip Nos. 53 and 59. In the tip Nos. 53 and 59, the TiN subsublayer was formed in the regions expanding from the edge line to the segment regions c and d, and the thickness shown was indicated as the thickness of the TiN subsublayer alone.

A milling test was conducted for each of the indexable cutting insert Nos. 53 to 77 under the conditions below to measure the amount of flank wear and the rate of fracture. In the wear resistance test, a state of deposition of a workpiece to the cutting edge and a state of the processed surface of the workpiece after milling for 5 m were observed. Tables VI and VII show the results.

<Conditions of Milling Test>
(Wear Resistance Test)
Workpiece: FCD450
Cutting speed: 250 m/min
Feed: 0.25 mm/edge
Depth of cut: 2.0 mm
Cutting oil: water-soluble oil
Cutting length: 5 m
Cutter: WGC4100R (manufactured by Sumitomo Electric Hardmetal Corp.).

The cutter was provided with one indexable cutting insert.
(Toughness Test)
Workpiece: FCD600 (three laminated)
Cutting speed: 210 m/min
Feed: 0.43 mm/edge
Depth of cut: 2.0 mm
Cutting oil: none
Cutting length: 0.5 m
Cutter: WGC4100R ((manufactured by Sumitomo Electric Hardmetal Corp.).

The cutter was provided with one indexable cutting insert. Evaluation: the rate of fracture is determined from the number of fracture when 20 cutting edges were used for cutting for 0.5 m.

TABLE VI

| | Cutter insert No. | Coating layer No. | Processing method | Outer sublayer A μm | Outer sublayer B μm | A/B | Rate of removal (%) | Amount of flank wear (mm) | Rate of fracture (%) | Deposition of workpiece to edge | State of processed surface of workpiece |
|---|---|---|---|---|---|---|---|---|---|---|---|
| | 53 | 8 | A | 0.6 (TiN) | 0.6 (TiN) | 1.00 | 0 | 0.231 | 100 | Large | Clouded |
| | 54 | 9 | A | 2.1 | 2.1 | 1.00 | 0 | 0.232 | 95 | Large | Clouded |
| | 55 | 10 | A | 2.4 | 2.4 | 1.00 | 0 | 0.235 | 95 | Large | Clouded |
| | 56 | 11 | A | 2.3 | 2.3 | 1.00 | 0 | 0.198 | 95 | Large | Clouded |
| | 57 | 12 | A | 1.7 | 1.7 | 1.00 | 0 | 0.248 | 85 | Large | Clouded |
| | 58 | 13 | A | 1.5 | 1.5 | 1.00 | 0 | 0.274 | 75 | Large | Clouded |
| | 59 | 8 | C | 0.4 (TiN) | 0.5 (TiN) | 0.80 | 0 | 0.240 | 95 | Large | Clouded |
| | 60 | 10 | C | 2.2 | 2.3 | 0.96 | 0 | 0.234 | 95 | None | Lustrous |
| * | 61 | 8 | C | 1.3 | 1.7 | 0.76 | 0 | 0.217 | 70 | None | Lustrous |
| | 62 | 8 | C | 0.8 | 1.6 | 0.50 | 0 | 0.206 | 60 | None | Lustrous |
| * | 63 | 9 | C | 0.8 | 1.7 | 0.47 | 0 | 0.194 | 65 | None | Lustrous |
| * | 64 | 10 | C | 1.6 | 2.0 | 0.80 | 0 | 0.188 | 65 | None | Lustrous |
| * | 65 | 11 | C | 0.6 | 1.0 | 0.60 | 0 | 0.185 | 60 | None | Lustrous |

TABLE VII

| | Cutter insert No. | Coating layer No. | Processing method | Outer sublayer A μm | Outer sublayer B μm | A/B | Rate of removal (%) | Amount of flank wear (mm) | Rate of fracture (%) | Deposition of workpiece to edge | State of processed surface of workpiece |
|---|---|---|---|---|---|---|---|---|---|---|---|
| * | 66 | 12 | C | 0.9 | 1.6 | 0.56 | 0 | 0.223 | 40 | None | Lustrous |
| * | 67 | 13 | C | 0.5 | 0.9 | 0.56 | 0 | 0.239 | 45 | None | Lustrous |
| * | 68 | 8 | E | 1.5 | 1.9 | 0.79 | 21 | 0.185 | 50 | None | Substantially mirror surface |
| * | 69 | 8 | G | 1.3 | 1.7 | 0.76 | 41 | 0.197 | 50 | None | Substantially mirror surface |
| * | 70 | 8 | E | 1.3 | 1.7 | 0.76 | 63 | 0.165 | 30 | None | Substantially mirror surface |
| * | 71 | 8 | D | 1.4 | 1.8 | 0.78 | 82 | 0.176 | 15 | None | Substantially mirror surface |
| * | 72 | 8 | E | 1.5 | 1.9 | 0.79 | 100 | 0.166 | 5 | None | Substantially mirror surface |
| * | 73 | 9 | E | 0.9 | 1.8 | 0.50 | 56 | 0.204 | 35 | None | Substantially mirror surface |
| * | 74 | 10 | D | 1.5 | 1.9 | 0.79 | 50 | 0.180 | 30 | None | Substantially mirror surface |
| * | 75 | 11 | E | 0.4 | 0.8 | 0.50 | 74 | 0.175 | 25 | None | Substantially mirror surface |
| * | 76 | 12 | H | 1.1 | 1.8 | 0.61 | 61 | 0.229 | 10 | None | Substantially mirror surface |
| * | 77 | 13 | D | 0.7 | 1.1 | 0.64 | 79 | 0.209 | 10 | None | Substantially mirror surface |

As is apparent from Tables VI and VII, each inventive indexable cutting insert in which A/B determined from the average thicknesses A μm and B μm of the outer sublayer was 0.95 or less had a satisfactory amount of flank wear and a satisfactory rate of fracture compared with those in comparative examples, and each inventive indexable cutting insert had an excellent balance between wear resistance and toughness. In each indexable cutting insert not having the alumina subsublayer but having the TiN subsublayer on the surface thereof, the workpiece was deposited on the cutting edge, and the processed workpiece was clouded.

As described above, each of the indexable cutting inserts of the present invention clearly has a satisfactory effect compared with the indexable cutting inserts in the comparative examples. The indexable cutting insert of the present invention had an excellent balance between wear resistance (on the rake face side in particular) and toughness (cutting edge in particular). In this example, the indexable cutting inserts each having a chip breaker were described. As described in examples below, the present invention is also effective for an indexable cutting insert without a chip breaker.

Example 4

Figure 12:
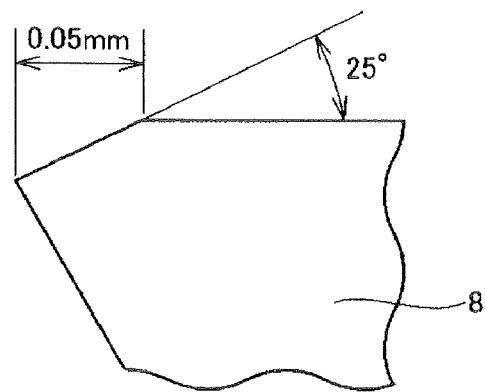
FIG. 12 is a schematic cross-sectional view of a treated cutting edge of a base according to an embodiment.

A cemented carbide powder with a composition containing 0.6 percent by mass of TaC, 0.2 percent by mass of $Cr_3C_2$, 8.4 percent by mass of Co, and the remainder of WC was pressed, sintered at 1,450° C. for 1 hour in a vacuum atmosphere, and then subjected to smooth polishing and edge processing of edge lines with a SiC brush (horning of a width of 0.05 mm at −25° from the rake face side, see FIG. 12) to prepare a cemented carbide tip as a base having the same shape as a cutter insert SPGN120408 (JIS B 4120:1998, revised). The base did not have a chip breaker or a β-free layer on the surface thereof. The base had one rake faces and four flank faces, each rake face and each flank face being connected with an edge line (a hypothetical line because the edge processing had been performed) provided therebetween. The base had a total of four edge lines. In addition, a point of intersection of two flank faces and one rake face was a corner (a hypothetical point of intersection because the edge processing had been performed). The base had a total of four corners.

As shown in Table VIII below, the same layers as in EXAMPLE 3 were formed on the entire surface of the base (that is, the coating layer numbers in Table VIII indicate the coating layer numbers in EXAMPLE 3).

The bases having the coating layers were processed by the same processing methods in EXAMPLE 1. In Table VIII, the thickness of the outer sublayer, A/B, and the rate of removal were determined by the same way as in EXAMPLE 1. In the indexable cutting insert including coating layer No. 8, the TiN subsublayer formed on the outer sublayer was completely removed in regions expanding from the edge line to the segment regions c and d, except for the tip Nos. 78 and 84. In the tip Nos. 78 and 84, the TiN subsublayer was formed in the regions expanding from the edge line to the segment regions c and d, and the thickness shown was indicated as the thickness of the TiN subsublayer alone.

As described above, 22 types of indexable cutting insert Nos. 78 to 99 shown in Table VIII below were produced. The sample numbers with asterisks "*" indicate that the samples were in the range of the present invention, and the other samples were comparative examples.

A milling test was conducted for each of the indexable cutting insert Nos. 78 to 99 under the conditions below to measure the amount of flank wear and the rate of fracture of each indexable cutting insert. In the wear resistance test, a state of deposition of a workpiece to the cutting edge and a state of the processed surface of the workpiece after milling for 5 m were observed. Table VIII shows the results.

<Conditions of Milling Test>
(Wear Resistance Test)
Workpiece: FCD500
Cutting speed: 200 m/min
Feed: 0.25 mm/edge
Depth of cut: 2.0 mm
Cutting oil: water-soluble oil
Cutting length: 5 m
Cutter: DPG4100R (manufactured by Sumitomo Electric Hardmetal Corp.).

The cutter was provided with one indexable cutting insert.
(Toughness Test)
Workpiece: FCD250 (three laminated)
Cutting speed: 250 m/min
Feed: 0.55 mm/edge
Depth of cut: 2.0 mm
Cutting oil: none
Cutting length: 0.5 m
Cutter: DPG4100R (manufactured by Sumitomo Electric Hardmetal Corp.).

The cutter was provided with one indexable cutting insert.
Evaluation: the rate of fracture is determined from the number of fracture when 20 cutting edges were used for cutting for 0.5 m.

TABLE VIII

|   | Cutter insert No. | Coating layer No. | Processing method | Outer sublayer A μm | Outer sublayer B μm | A/B | Rate of removal (%) | Amount of flank wear (mm) | Rate of fracture (%) | Deposition of workpiece to edge | State of processed surface of workpiece |
|---|---|---|---|---|---|---|---|---|---|---|---|
|   | 78 | 8 | A | 0.6 (TiN) | 0.6 (TiN) | 1.00 | 0 | 0.261 | 100 | Large | Clouded |
|   | 79 | 9 | A | 2.1 | 2.1 | 1.00 | 0 | 0.261 | 95 | Large | Clouded |
|   | 80 | 10 | A | 2.4 | 2.4 | 1.00 | 0 | 0.223 | 95 | Large | Clouded |
|   | 81 | 11 | A | 2.3 | 2.3 | 1.00 | 0 | 0.239 | 100 | Large | Clouded |
|   | 82 | 12 | A | 1.7 | 1.7 | 1.00 | 0 | 0.268 | 90 | Large | Clouded |
|   | 83 | 13 | A | 1.5 | 1.5 | 1.00 | 0 | 0.304 | 80 | Large | Clouded |
|   | 84 | 8 | C | 0.2 (TiN) | 0.6 (TiN) | 0.33 | 0 | 0.255 | 100 | Large | Clouded |
|   | 85 | 8 | C | 2.01 | 2.05 | 0.98 | 0 | 0.249 | 95 | None | Lustrous |
| * | 86 | 8 | C | 1.3 | 1.7 | 0.76 | 0 | 0.230 | 75 | None | Lustrous |
| * | 87 | 8 | C | 1.0 | 1.8 | 0.56 | 0 | 0.197 | 65 | None | Lustrous |
| * | 88 | 9 | C | 1.0 | 1.9 | 0.53 | 0 | 0.225 | 60 | None | Lustrous |

TABLE VIII-continued

| | Cutter insert No. | Coating layer No. | Processing method | Outer sublayer A μm | Outer sublayer B μm | A/B | Rate of removal (%) | Amount of flank wear (mm) | Rate of fracture (%) | Deposition of workpiece to edge | State of processed surface of workpiece |
|---|---|---|---|---|---|---|---|---|---|---|---|
| * | 89 | 10 | C | 1.6 | 2.0 | 0.80 | 0 | 0.211 | 70 | None | Lustrous |
| * | 90 | 11 | C | 0.5 | 0.9 | 0.56 | 0 | 0.215 | 65 | None | Lustrous |
| * | 91 | 12 | C | 0.8 | 1.6 | 0.50 | 0 | 0.249 | 50 | None | Lustrous |
| * | 92 | 13 | C | 0.7 | 1.0 | 0.70 | 0 | 0.244 | 50 | None | Lustrous |
| * | 93 | 8 | E | 1.4 | 1.8 | 0.78 | 26 | 0.186 | 55 | None | Substantially mirror surface |
| * | 94 | 8 | G | 1.3 | 1.7 | 0.76 | 45 | 0.201 | 50 | None | Substantially mirror surface |
| * | 95 | 8 | E | 1.4 | 1.8 | 0.78 | 61 | 0.198 | 35 | None | Substantially mirror surface |
| * | 96 | 8 | D | 1.4 | 1.8 | 0.78 | 82 | 0.187 | 25 | None | Substantially mirror surface |
| * | 97 | 8 | E | 1.4 | 1.8 | 0.78 | 100 | 0.163 | 5 | None | Substantially mirror surface |
| * | 98 | 9 | E | 0.8 | 1.7 | 0.47 | 51 | 0.220 | 35 | None | Substantially mirror surface |
| * | 99 | 13 | D | 0.7 | 1.0 | 0.70 | 84 | 0.241 | 10 | None | Substantially mirror surface |

As is apparent from Table VIII, each inventive indexable cutting insert in which A/B determined from the average thicknesses A μm and B μm of the outer sublayer was 0.95 or less had a satisfactory amount of flank wear and a satisfactory rate of fracture compared with those in comparative examples, and each inventive indexable cutting insert had an excellent balance between wear resistance and toughness. In each indexable cutting insert not having the alumina subsublayer but having the TiN subsublayer on the surface thereof, the workpiece was deposited on the cutting edge, and the processed workpiece was clouded.

As described above, each of the indexable cutting inserts of the present invention clearly has a satisfactory effect compared with the indexable cutting inserts in the comparative examples. The indexable cutting insert of the present invention had an excellent balance between wear resistance (on the rake face side in particular) and toughness (cutting edge in particular).

Example 5

Figure 13:
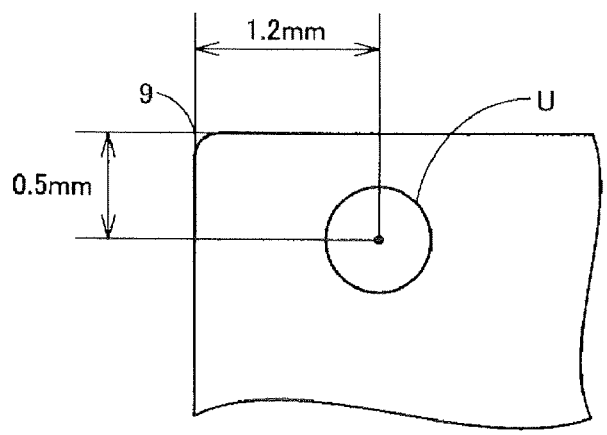
FIG. 13 is a schematic side view of the vicinity of a corner on the rake face side of an indexable cutting insert.

In EXAMPLE 1, the residual stress in each of alumina (α-$Al_2O_3$ or κ-$Al_2O_3$) subsublayers constituting the outer sublayers in the indexable cutting insert Nos. 3, 4, 18, and 19 were measured. The residual stress was measured in a spot U (spot diameter: 0.5 mm), shown in FIG. 13, close to the corner 9 (in fact, a hypothetic corner is represented because the edge processing had been performed) participating in cutting on the flank face side of each of the indexable cutting inserts (specifically, a measurement was performed by the $\sin^2 \phi$ technique with an X-ray stress measurement device). This measurement region is a representative region of the portion of the flank face participating in cutting.

With respect to the indexable cutting insert No. 18, three different indexable cutting insert Nos. 18-2, 18-3, and 18-4 were prepared by changing the conditions for blasting so as to have different residual stresses. The residual stresses were measured in the same way as above. Similarly, with respect to the indexable cutting insert No. 19, three different indexable cutting insert Nos. 19-2, 19-3, and 19-4 were prepared so as to have different residual stresses. The residual stresses were also measured. Table IX shows the results.

For each of the indexable cutting inserts, the amount of flank wear and the rate of fracture were measured as in EXAMPLE 1. Table IX also shows the results. In Table IX, the sample numbers with asterisks "*" indicate that the samples were in the range of the present invention, and the other samples were comparative examples.

TABLE IX

| | Cutter insert No. | Residual stress (GPa) | Rate of fracture (%) | Amount of flank wear (mm) |
|---|---|---|---|---|
| | 3 | 0.2 | 85 | 0.218 |
| * | 18 | −0.2 | 40 | 0.210 |
| * | 18-2 | −1.2 | 30 | 0.207 |
| * | 18-3 | −2.9 | 10 | 0.202 |
| * | 18-4 | 0.0 | 60 | 0.210 |
| | 4 | 0.3 | 95 | 0.213 |
| * | 19 | −0.2 | 45 | 0.205 |
| * | 19-2 | −1.4 | 25 | 0.205 |
| * | 19-3 | −3.2 | 10 | 0.202 |
| * | 19-4 | 0.0 | 65 | 0.206 |

As is apparent from Table IX, the results demonstrated that in the portion of the flank face participating in cutting, when the alumina subsublayer serving as the outer sublayer had a compressive stress, satisfactory toughness was expressed. In particular, an increase in compressive stress further improved toughness (resistance to fracture).

Example 6

In EXAMPLE 2, the residual stress in each of alumina (α-$Al_2O_3$ or κ-$Al_2O_3$) subsublayers constituting the outer sublayers in the indexable cutting insert Nos. 33, 34, 38, and 40 were measured. The residual stress was measured in a spot U (spot diameter: 0.5 mm), shown in FIG. 13, close to the corner (in fact, a hypothetic corner is represented because the edge processing had been performed) participating in cutting on the flank face side of each of the indexable cutting inserts (specifically, a measurement was performed by the $\sin^2 \phi$ technique with an X-ray stress measurement device). This measurement region is a representative region of the portion of the flank face participating in cutting.

With respect to the indexable cutting insert No. 38, three different indexable cutting insert Nos. 38-2, 38-3, and 38-4 were prepared by changing the conditions for blasting so as to have different residual stresses. The residual stresses were measured in the same way as above. Similarly, with respect to the indexable cutting insert No. 40, three different indexable cutting insert Nos. 40-2, 40-3, and 40-4 were prepared so as to have different residual stresses. The residual stresses were also measured. Table X shows the results.

For each of the indexable cutting inserts, the amount of flank wear and the rate of fracture were measured as in EXAMPLE 2. Table X also shows the results. In Table X, the sample numbers with asterisks "*" indicate that the samples were in the range of the present invention, and the other samples were comparative examples.

TABLE X

| Cutter insert No. | Residual stress (GPa) | Rate of fracture (%) | Amount of flank wear (mm) |
|---|---|---|---|
|   33 | 0.2 | 100 | 0.261 |
| * 38 | −0.4 | 60 | 0.250 |
| * 38-2 | −1.4 | 40 | 0.250 |
| * 38-3 | −3.1 | 20 | 0.248 |
| * 38-4 | 0.1 | 70 | 0.249 |
|   34 | 0.2 | 95 | 0.309 |
| * 40 | −0.2 | 60 | 0.305 |
| * 40-2 | −0.8 | 45 | 0.301 |
| * 40-3 | −2.1 | 25 | 0.300 |
| * 40-4 | 0.0 | 70 | 0.302 |

As is apparent from Table X, the results demonstrated that in the portion of the flank face participating in cutting, when the alumina subsublayer serving as the outer sublayer had a compressive stress, satisfactory toughness was expressed. In particular, an increase in compressive stress further improved toughness (resistance to fracture).

Example 7

Figure 14:
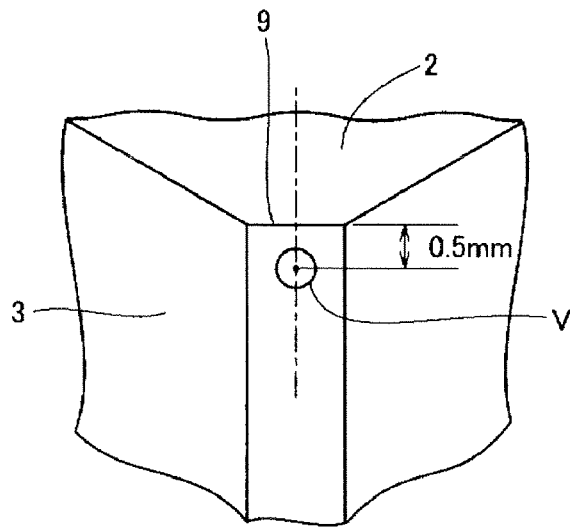
FIG. 14 is a schematic side view of the vicinity of a corner on the rake face side of an indexable cutting insert different from that in FIG. 13.

In EXAMPLE 3, the residual stress in each of alumina ($\alpha$-$Al_2O_3$ or $\kappa$-$Al_2O_3$) subsublayers constituting the outer sublayers in the indexable cutting insert Nos. 54, 55, 63, and 64 were measured. The residual stress was measured in a spot V (spot diameter: 0.5 mm), shown in FIG. 14, close to the corner participating in cutting on the flank face side of each of the indexable cutting inserts, the measurement being performed from a direction perpendicular to a plane including the spot V (specifically, a measurement was performed by the $\sin^2 \phi$ technique with an X-ray stress measurement device). This measurement region is a representative region of the portion of the flank face participating in cutting.

With respect to the indexable cutting insert No. 63, three different indexable cutting insert Nos. 63-2, 63-3, and 63-4 were prepared by changing the conditions for blasting so as to have different residual stresses. The residual stresses were measured in the same way as above. Similarly, with respect to the indexable cutting insert No. 64, three different indexable cutting insert Nos. 64-2, 64-3, and 64-4 were prepared so as to have different residual stresses. The residual stresses were also measured. Table XI shows the results.

For each of the indexable cutting inserts, the amount of flank wear and the rate of fracture were measured as in EXAMPLE 3. Table XI also shows the results. In Table XI, the sample numbers with asterisks "*" indicate that the samples were in the range of the present invention, and the other samples were comparative examples.

TABLE XI

| Cutter insert No. | Residual stress (GPa) | Rate of fracture (%) | Amount of flank wear (mm) |
|---|---|---|---|
|   54 | 0.2 | 95 | 0.232 |
| * 63 | −0.2 | 65 | 0.194 |
| * 63-2 | −1.8 | 40 | 0.193 |
| * 63-3 | −2.9 | 25 | 0.189 |
| * 63-4 | 0.2 | 70 | 0.192 |
|   55 | 0.1 | 95 | 0.235 |
| * 64 | −0.3 | 65 | 0.188 |
| * 64-2 | −1.3 | 45 | 0.185 |
| * 64-3 | −2.6 | 20 | 0.186 |
| * 64-4 | 0.0 | 75 | 0.189 |

As is apparent from Table XI, the results demonstrated that in the portion of the flank face participating in cutting, when the alumina subsublayer serving as the outer sublayer had a compressive stress, satisfactory toughness was expressed. In particular, an increase in compressive stress further improved toughness (resistance to fracture).

Example 8

Figure 15:
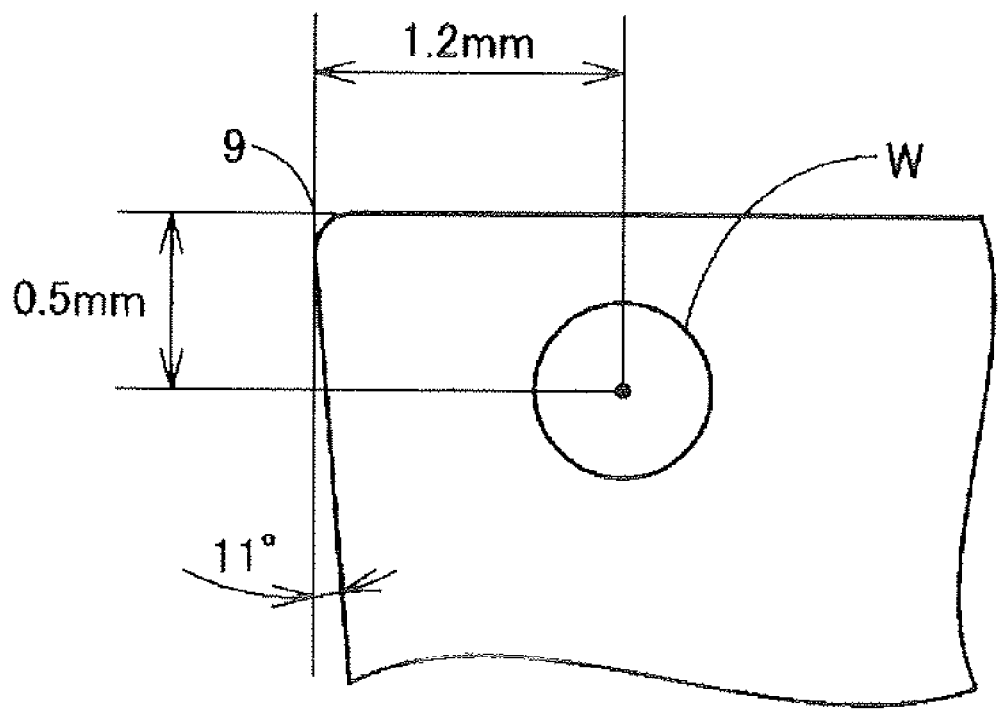
FIG. 15 is a schematic side view of the vicinity of a corner on the rake face side of an indexable cutting insert different from that shown in FIG. 13.
Figure 16:
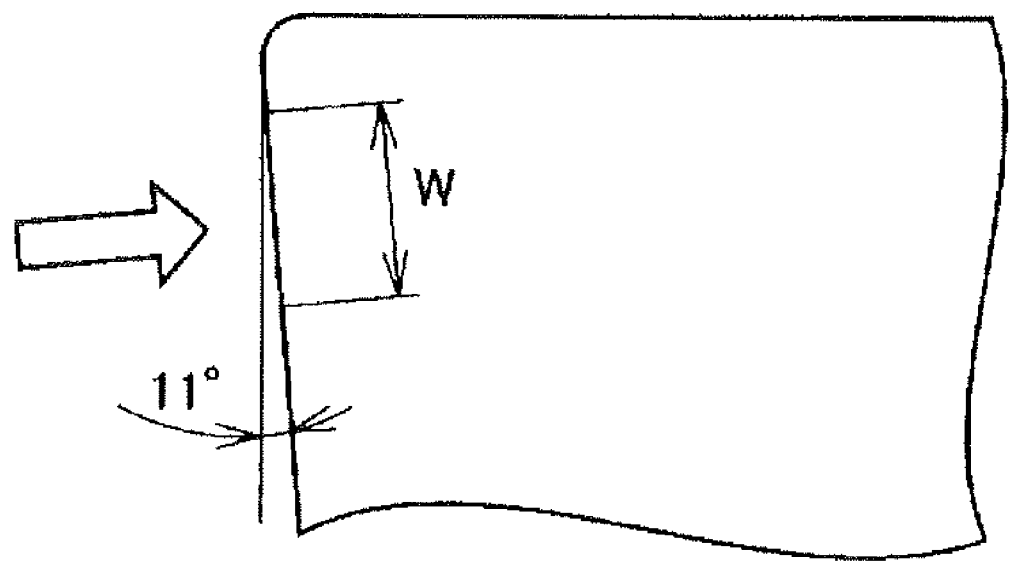
FIG. 16 is a schematic side view of the indexable cutting insert shown in FIG. 15 when viewed from a different direction.

In EXAMPLE 4, the residual stress in each of alumina ($\alpha$-$Al_2O_3$) subsublayers constituting the outer sublayers in the indexable cutting insert Nos. 78, 81, 86, and 90 were measured. The residual stress was measured in a spot W (spot diameter: 0.5 mm), shown in FIG. 15, close to the corner 9 (in fact, a hypothetic corner is represented because the edge processing had been performed) participating in cutting on the flank face side of each of the indexable cutting inserts, the measurement being performed from a direction perpendicular to a plane including the spot W as indicated by an arrow shown in FIG. 16 (specifically, a measurement was performed by the $\sin^2 \phi$ technique with an X-ray stress measurement device). This measurement region is a representative region of the portion of the flank face participating in cutting.

With respect to the indexable cutting insert No. 86, three different indexable cutting insert Nos. 86-2, 86-3, and 86-4 were prepared by changing the conditions for blasting so as to have different residual stresses. The residual stresses were measured in the same way as above. Similarly, with respect to the indexable cutting insert No. 90, three different indexable cutting insert Nos. 90-2, 90-3, and 90-4 were prepared so as to have different residual stresses. The residual stresses were also measured. Table XII shows the results.

For each of the indexable cutting inserts, the amount of flank wear and the rate of fracture were measured as in EXAMPLE 4. Table XII also shows the results. In Table XII, the sample numbers with asterisks "*" indicate that the samples were in the range of the present invention, and the other samples were comparative examples.

TABLE XII

| Cutter insert No. | Residual stress (GPa) | Rate of fracture (%) | Amount of flank wear (mm) |
|---|---|---|---|
|   78 | 0.2 | 100 | 0.261 |
| * 86 | −0.2 | 75 | 0.230 |
| * 86-2 | −0.5 | 55 | 0.231 |
| * 86-3 | −1.9 | 25 | 0.232 |
| * 86-4 | 0.0 | 80 | 0.233 |
|   81 | 0.2 | 100 | 0.239 |
| * 90 | −0.2 | 65 | 0.215 |
| * 90-2 | −0.8 | 50 | 0.214 |
| * 90-3 | −2.2 | 25 | 0.216 |
| * 90-4 | 0.0 | 75 | 0.215 |

As is apparent from Table XII, the results demonstrated that in the portion of the flank face participating in cutting, when the alumina subsublayer serving as the outer sublayer had a compressive stress, satisfactory toughness was expressed. In particular, an increase in compressive stress further improved toughness (resistance to fracture).

The embodiments and examples of the present invention described above may be combined appropriately, which is also assumed in the present invention.

The embodiments and examples which have been disclosed herein are illustrative only and not to be construed as limiting the scope of the present invention. The invention is not limited by the illustrative embodiments, but only by the scope of the appended claims, and it should be understood that various modifications may be made within the scope of the appended claims or the equivalents thereof.

The invention claimed is:

1. An indexable cutting insert comprising a base and a coating layer,
   wherein the base includes at least one flank face and at least one rake face,
   the flank face is connected to the rake face with an edge line provided therebetween,
   the coating layer includes an inner sublayer having one or more subsublayers and an outer sublayer formed on the inner sublayer,
   each of the subsublayers constituting the inner sublayer is composed of a compound containing at least one element selected from the group consisting of Group IVa elements, Group Va elements, Group VIa elements in the periodic table, Al, and Si, and at least one element selected from the group consisting of carbon, nitrogen, oxygen, and boron,
   the outer sublayer is an alumina sublayer or a sublayer containing aluminum, and
   in portions of the outer sublayer configured to participate in cutting, when an average thickness on the flank face side is represented by A μm and an average thickness on the rake face side is represented by B μm, A/B≦0.95,
   wherein of the outer sublayer configured to participate in cutting has a compressive stress, and
   wherein the inner sublayer and the outer sublayer excluding the outer sublayer configured to participate in cutting have a tensile stress.

2. The indexable cutting insert according to claim 1, wherein the uppermost subsublayer constituting the inner sublayer is in contact with the outer sublayer and is composed of a compound containing Ti and at least one element selected from carbon, nitrogen, oxygen, and boron.

3. The indexable cutting insert according to claim 2, wherein the compound containing Ti and at least one element selected from carbon, nitrogen, oxygen, and boron is titanium boronitride $TiB_XN_Y$ (wherein X and Y are each expressed in terms of atomic percent, and $0.001<X/(X+Y)<0.04$).

4. The indexable cutting insert according to claim 2, wherein the compound containing Ti and at least one element selected from carbon, nitrogen, oxygen, and boron is titanium oxyboronitride $TiB_XN_YO_Z$ (wherein X, Y, and Z are each expressed in terms of atomic percent, $0.0005<X/(X+Y+Z)<0.04$ and $0<Z/(X+Y+Z)<0.5$).

5. The indexable cutting insert according to claim 1, wherein the outer sublayer is not formed on part or the entirety of an edge line portion configured to participate in cutting.

6. The indexable cutting insert according to claim 1, wherein the coating layer has a thickness of 0.05 μm to 30 μm.

7. The indexable cutting insert according to claim 1, wherein the base is composed of a material selected from cemented carbides, cermets, high-speed steels, ceramic materials, sintered cubic boron nitride compacts, sintered diamond compacts, and sintered silicon nitride compacts.

8. The indexable cutting insert according to claim 1, wherein a flank face participating in cutting has a compressive stress.

9. The indexable cutting insert according to claim 1, wherein, in the inner sublayer, a thickness on the flank face and a thickness on the rake face are substantially the same.

10. An indexable cutting insert comprising a base and a coating layer,
    wherein the base includes at least two flank faces, at least one rake face, and at least one corner,
    each of the flank faces is connected to the rake face with an edge line provided therebetween,
    the corner is a point of intersection of the two flank faces and the rake face,
    the coating layer includes an inner sublayer having one or more subsublayers and an outer sublayer formed on the inner sublayer,
    each of the subsublayers constituting the inner sublayer is composed of a compound containing at least one element selected from the group consisting of Group IVa elements, Group Va elements, Group VIa elements in the periodic table, Al, and Si, and at least one element selected from the group consisting of carbon, nitrogen, oxygen, and boron,
    the outer sublayer is an alumina sublayer or a sublayer containing aluminum, and
    on a line passing through the corner configured to participate in cutting and bisecting an angle defined by the two flank faces constituting the corner, the line lying on the rake face and extending to an edge where the two flank faces intersect each other, when the average thickness of the outer sublayer in a segment region from 0.5 mm to 1 mm apart from the corner toward one of the flank faces is defined as A μm, and when the average thickness of the outer sublayer in a segment region from 0.5 mm to 1 mm apart from the corner toward the rake face is defined as B μm, A/B≦0.95,
    wherein the outer sublayer configured to participate in cutting has a compressive stress, and
    wherein the inner sublayer and the outer sublayer excluding the outer sublayer configured to participate in cutting have a tensile stress.

11. The indexable cutting insert according to claim 10, wherein the uppermost subsublayer constituting the inner sublayer is in contact with the outer sublayer and is composed of a compound containing Ti and at least one element selected from carbon, nitrogen, oxygen, and boron.

12. The indexable cutting insert according to claim 11, wherein the compound containing Ti and at least one element selected from carbon, nitrogen, oxygen, and boron is titanium boronitride $TiB_XN_Y$ (wherein X and Y are each expressed in terms of atomic percent, and $0.001<X/(X+Y)<0.04$).

13. The indexable cutting insert according to claim 11, wherein the compound containing Ti and at least one element selected from carbon, nitrogen, oxygen, and boron is titanium oxyboronitride $TiB_XN_YO_Z$ (wherein X, Y, and Z are each expressed in terms of atomic percent, $0.0005<X/(X+Y+Z)<0.04$ and $0<Z/(X+Y+Z)<0.5$).

14. The indexable cutting insert according to claim 10, wherein the outer sublayer is not formed on part or the entirety of an edge line portion configured to participate in cutting.

15. The indexable cutting insert according to claim 10, wherein the coating layer has a thickness of 0.05 μm to 30 μm.

16. The indexable cutting insert according to claim 10, wherein the base is composed of a material selected from cemented carbides, cermets, high-speed steels, ceramic materials, sintered cubic boron nitride compacts, sintered diamond compacts, and sintered silicon nitride compacts.

17. The indexable cutting insert according to claim 10, wherein a flank face participating in cutting has a compressive stress.

18. The indexable cutting insert according to claim 10, wherein, in the inner sublayer, a thickness on each of the two flank faces and a thickness on the rake face are substantially the same.

* * * * *